US012511518B2

(12) United States Patent
Wang et al.

(10) Patent No.: US 12,511,518 B2
(45) Date of Patent: Dec. 30, 2025

(54) PARAMETER UPDATING METHOD AND APPARATUS AND STORAGE MEDIUM

(71) Applicant: HUAWEI TECHNOLOGIES CO., LTD., Guangdong (CN)

(72) Inventors: Zidong Wang, Hangzhou (CN); Mengyun Chen, Hangzhou (CN); Fan Yu, Hangzhou (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 639 days.

(21) Appl. No.: 17/993,436

(22) Filed: Nov. 23, 2022

(65) Prior Publication Data
US 2023/0092453 A1  Mar. 23, 2023

Related U.S. Application Data

(63) Continuation of application No. PCT/CN2021/090816, filed on Apr. 29, 2021.

(30) Foreign Application Priority Data

May 26, 2020 (CN) .......................... 202010455591.7

(51) Int. Cl.
*G06N 3/04* (2023.01)
*G06F 17/16* (2006.01)
(Continued)

(52) U.S. Cl.
CPC .............. *G06N 3/04* (2013.01); *G06F 17/16* (2013.01); *G06F 18/214* (2023.01); *G06N 3/045* (2023.01);
(Continued)

(58) Field of Classification Search
CPC ........ G06N 20/00; G06N 20/10; G06N 20/20; G06N 3/04; G06N 3/045; G06N 3/0464;
(Continued)

(56) References Cited

U.S. PATENT DOCUMENTS

2019/0362228 A1* 11/2019 Sato .................. G06F 17/16
2020/0064444 A1*  2/2020 Regani .............. G01S 7/006

FOREIGN PATENT DOCUMENTS

CN        108601033 A       9/2018
CN        110033081 A       7/2019

OTHER PUBLICATIONS

Roux et al., "Topmoumoute online natural gradient algorithm," Proceedings of Advances in Neural Information Processing Systems, Dec. 2007, pp. 849-856.
(Continued)

*Primary Examiner* — Shane D Woolwine
(74) *Attorney, Agent, or Firm* — Fish & Richardson P.C.

(57) ABSTRACT

The present disclosure relates to parameter updating methods. In one example method, a parameter in a neural network model is updated for a plurality of times through a plurality of iterations. The plurality of iterations include a first iteration period and a second iteration period. In the first iteration period, an inverse matrix of an additional matrix of the neural network model is updated once based on a quantity of iterations indicated by a first update stride. In the second iteration period, the inverse matrix of the additional matrix of the neural network model is updated once based on a quantity of iterations indicated by a second update stride, where the first iteration of the second iteration period is after the last iteration of the first iteration period in an iteration sequence, and the second update stride is greater than the first update stride.

20 Claims, 12 Drawing Sheets

(51) Int. Cl.
*G06F 18/214* (2023.01)
*G06N 3/045* (2023.01)
*G06N 3/0464* (2023.01)
*G06N 3/08* (2023.01)
*G06N 3/082* (2023.01)
*G06N 3/0985* (2023.01)
*G06V 10/44* (2022.01)
*G06V 10/774* (2022.01)
*G06V 10/82* (2022.01)
*G06V 20/58* (2022.01)

(52) U.S. Cl.
CPC .......... *G06N 3/0464* (2023.01); *G06N 3/082* (2013.01); *G06V 10/774* (2022.01); *G06V 10/82* (2022.01); *G06V 20/58* (2022.01); *G06N 3/08* (2013.01); *G06N 3/0985* (2023.01); *G06V 10/454* (2022.01)

(58) Field of Classification Search
CPC .......... G06N 3/08; G06N 3/082; G06N 3/088; G06N 3/0895; G06N 3/09; G06N 3/091; G06N 3/092; G06N 3/0985; G06F 17/16; G06F 18/214; G06V 10/774; G06V 10/82; G06V 10/454; G06V 20/58
See application file for complete search history.

(56) References Cited

OTHER PUBLICATIONS

Yang et al., "Joint Unsupervised Learning of Deep Representations and Image Clusters," 2016 IEEE Conference on Computer Vision and Pattern Recognition, Jun. 30, 2016, 10 pages.

Martens et al., "Optimizing neural networks with Kronecker-factored approximate curvature," Proceedings of the 32 nd International Conference on Machine Learning, Jul. 2015, pp. 2408-2417.

Grosse et al., "A Kronecker-factored approximate Fisher matrix for convolution layers," Proceedings of the 33 rd International Conference on Machine Learning, Jun. 2016, 24 pages.

International Search Report and Written Opinion in International Appln. No. PCT/CN2021/090816, mailed on Jul. 16, 2021, 16 pages (with English translation).

* cited by examiner

PARAMETER UPDATING METHOD AND APPARATUS AND STORAGE MEDIUM

CROSS-REFERENCE TO RELATED APPLICATIONS

This application is a continuation of International Application No. PCT/CN2021/090816, filed on Apr. 29, 2021, which claims priority to Chinese Patent Application No. 202010455591.7, filed on May 26, 2020. The disclosures of the aforementioned applications are hereby incorporated by reference in their entireties.

TECHNICAL FIELD

This application relates to the field of artificial intelligence (AI), and specifically, to a parameter updating method and apparatus and a storage medium.

BACKGROUND

Machine learning shows excellent performance in many application fields, for example, is widely used in applications such as image recognition, target detection, and natural language processing. In any application field, a neural network model is trained by using sample data in a corresponding application field, and then a trained neural network model is applied to each application field.

Iteration is performed on the neural network model for a plurality of times during training. A first-order optimization algorithm and a second-order optimization algorithm are usually sampled for each iteration to update a parameter in the neural network model once. During first-order optimization, first-order derivation is usually performed on a loss function of the neural network model by using a stochastic gradient descent (SGD) algorithm, to obtain a first-order gradient of the parameter. Then, second-order optimization is performed based on the first-order gradient by using the second-order optimization algorithm, to obtain a second-order gradient of the parameter.

During the second-order optimization, an inverse matrix of an additional matrix of the neural network model is computed. The inverse matrix has extremely large computational complexity, which affects a training speed of the neural network model.

SUMMARY

Embodiments of this application provide a parameter updating method, to reduce training time of a neural network model. Embodiments of this application further provide a corresponding apparatus and a storage medium.

A first aspect of this application provides a parameter updating method. The parameter updating method is used to update a parameter in a neural network model for a plurality of times through a plurality of iterations. The plurality of iterations include a first iteration period and a second iteration period. The method includes: updating, in the first iteration period, an inverse matrix of an additional matrix of the neural network model once based on a quantity of iterations indicated by each first update stride, where the first iteration period includes at least two iterations; and updating, in the second iteration period, the inverse matrix of the additional matrix of the neural network model once based on a quantity of iterations indicated by each second update stride, where the second iteration period includes at least two iterations, the first iteration of the second iteration period is after the last iteration of the first iteration period in an iteration sequence, and the second update stride is greater than the first update stride.

In the first aspect, an idea of step-based update is proposed, and an entire training process of the neural network model is divided into a plurality of iteration periods, and in one iteration period, the inverse matrix of the additional matrix of the neural network model is updated once based on a quantity of iterations indicated by each update stride. The neural network model includes a deep neural network (DNN) model or a convolutional neural network (CNN) model. In the training process of the model, the parameter in the neural network model may be a weight of each neuron in the neural network model. A process of training the neural network model by using sample data usually requires a plurality of iterations to obtain a target neural network model, and each iteration may be referred to as one step. In the training process of the neural network model, input data is the sample data, and output data is the weight of each neuron in the neural network model. The sample data may be image data, voice data, or text data, and a type of the sample data is determined based on a field to which the neural network model is applicable. For example, when the neural network model is used in the automated driving field, the sample data may be various image data in a traffic scenario, such as an image of a building, an image of a pedestrian, an image of a vehicle, an image of a ground identifier, and an image of a traffic light around an automated driving vehicle. When the neural network model is used in intelligent security protection or a safe city, the sample data may be various image data of a city, such as an image of each block of the city. When the neural network model is used in another service scenario, the sample data is data of types such as an image, an audio, or a text of a corresponding service scenario. The entire training process starts with the first iteration, and ends until all steps in the entire training process of obtaining the target neural network model may be divided into at least two iteration periods. For example, it takes 10,000 iterations to complete training of the neural network model, and the 10,000 times may be divided into 10 iteration periods. The 10 iteration periods are arranged from a period 1 to a period 10 based on a sequence in which the iteration periods are used in an iteration process. Lengths of the iteration periods may be the same. For example, each iteration period includes 1000 steps. Alternatively, the lengths of the iteration periods may be different. For example, some iteration periods include hundreds of steps, and some iteration periods include thousands of steps. If a convergence condition for training the neural network model is not a preset quantity of iterations, more iteration periods may be set to ensure that the set iteration periods are not used up when the neural network model converges. One iteration period may also be one epoch. The first iteration period and the second iteration period may be any two of all iteration periods, provided that the second iteration period is after the first iteration period in an execution sequence. Each iteration period corresponds to one update stride. The update stride represents an update spacing, and represents that the inverse matrix of the additional matrix of the neural network model is updated once at each update stride; or the update stride may be described as that updating is performed once every (the update stride-1). The update stride may alternatively be referred to as an update interval. The update stride may be an integer value greater than or equal to 1. A change trend of the update stride may be that an update stride of a corresponding iteration period increases as a quantity of iterations increases. Alternatively, update strides of some iteration periods are equal, and update strides of some iteration periods are greater than update strides of previous iteration periods. The update stride may be set as a square, a cosine curve, an exponential curve, a multiple increase, a piecewise constant, or the like of a sequence number of the iteration period. The additional matrix is a matrix that pre-processes a first-order gradient. The additional matrix may be a second-order information matrix or an approximate matrix in a second-order optimization algorithm. The second-order information matrix may include a Fisher Information Matrix (FIM) in a natural gradient method or a Hessian matrix in a Newton method. The additional matrix may alternatively be another additional matrix, for example, a second-order moment of a gradient. The second-order moment is a product of a first-order gradient and a transposition of the first-order gradient. The first-order gradient is a first-order derivative of a loss function to a parameter in the neural network model, and may be expressed as: $\nabla_\theta = df(x)/dx$, where $\nabla_\theta$ represents the first-order gradient, $f(x)$ represents the loss function, x represents the parameter in the neural network model, and $df(x)/dx$ represents the first-order derivative of the loss function to the parameter in the neural network model. It can be learned from the first aspect that, based on the step-based update, the inverse matrix of the additional matrix of the neural network model is updated once based on the quantity of iterations indicated by each update stride, and it is not necessary to update the inverse matrix in each iteration. In this way, time overheads of updating the inverse matrix of the additional matrix can be reduced, thereby reducing training time of the neural network model, and improving a training speed of the neural network model.

In a possible implementation of the first aspect, the plurality of iterations include a third iteration period, and the third iteration period is any iteration period of the plurality of iterations. The method further includes: if an $N^{th}$ iteration in the plurality of iterations is in the third iteration period, and is an iteration in which an inverse matrix needs to be updated and that is indicated by a third update stride, updating the inverse matrix of the additional matrix of the neural network model, and updating the parameter in the neural network model by using an updated inverse matrix of the additional matrix and a first-order gradient of the $N^{th}$ iteration, where the third update stride is an update stride of the third iteration period, N is an integer, and N>1.

In this possible implementation, the third iteration period may be the first iteration period, may be the second iteration period, or may be any other iteration period. The $N^{th}$ iteration may be any iteration of the neural network model from the second iteration of training to the end of training. Actually, an inverse matrix may be updated in the first iteration, that is, when N=1. It is just that update in the first iteration does not need to be indicated by the third update stride, and an inverse matrix to be updated in the first iteration may be indicated by a preset update start location. In this possible implementation, for a step in which update needs to be performed, an inverse matrix is updated, and the parameter is updated by using an updated inverse matrix, so that the neural network model converges.

In a possible implementation of the first aspect, the updating the inverse matrix of the additional matrix of the neural network model, and updating the parameter in the neural network model by using an updated inverse matrix of the additional matrix and a first-order gradient of the $N^{th}$ iteration includes: updating inverse matrices of additional matrices of P blocks, where the P blocks are some or all of Q blocks of the neural network model, P and Q are integers, $Q \geq P$, $Q \geq 2$, and $P \geq 1$; updating a parameter of a corresponding block in the P blocks by using updated inverse matrices of the additional matrices of the P blocks, and a first-order gradient of the P blocks in the $N^{th}$ iteration; and if Q>P, for (Q-P) blocks other than the P blocks, updating a parameter of a corresponding block in the (Q-P) blocks by using inverse matrices of additional matrices used by the (Q-P) blocks in the $(N-1)^{th}$ iteration and a first-order gradient of the (Q-P) blocks in the $N^{th}$ iteration.

In this possible implementation, an idea of block-based update is proposed, and the neurons in the neural network model may be divided into at least two blocks, and then an inverse matrix of an additional matrix of a corresponding block is updated based on the blocks. A concept of the "block (block)" may be a set of vector relationships of neurons between two adjacent layers in the neural network model, and the set may alternatively be referred to as a "layer (layer)". A division manner of the block is not limited to division based on layers, and may be division based on neurons in the neural network model. In this division manner, 1.5 layers, two layers, or more layers may form one block. When the inverse matrix is updated based on the blocks, all blocks or some of the blocks may be updated. Usually, at the beginning of model training, all the blocks are updated. As a quantity of iterations increases, a quantity of blocks in which inverse matrices need to be updated is reduced. If Q=8 and P=3, inverse matrices of additional matrices of three blocks are updated, parameters of the three blocks are updated by using updated inverse matrices, inverse matrices of the other five blocks are not updated, and parameters of this time are updated by using inverse matrices used in a previous iteration. It can be learned from this possible implementation that, based on the block-based update, the inverse matrices of the additional matrices of all the blocks or some of the blocks can be updated based on a requirement. In this way, time overheads of updating the inverse matrix can be reduced, thereby reducing training time of the neural network model, and improving a training speed of the neural network model.

In a possible implementation of the first aspect, the method further includes: obtaining the P blocks from M blocks in the neural network model based on information about additional matrices of the M blocks, where the information about the additional matrix includes a trace of the additional matrix or a 2-norm of the additional matrix, the M blocks are blocks that are in the Q blocks in the $N^{th}$ iteration and whose additional matrices need to be updated, M is an integer, and $Q \geq M \geq P$.

In this possible implementation, the trace of the additional matrix is a sum of values on a diagonal of the additional matrix. The 2-norm of the additional matrix is an extraction of square root of a maximum eigenvalue after a transposition of the additional matrix is multiplied by the additional matrix. The additional matrix is an equal-row and equal-column matrix, which may also be referred to as a positive-definite matrix. If the additional matrix is a matrix of 8 rows×8 columns, the additional matrix includes 64 values. A sum of 8 values on a diagonal line of the matrix may be referred to as a trace of the additional matrix. The additional matrices of the M blocks in the Q blocks further need to be updated. (Q-M) blocks other than the M blocks are blocks that basically do not change in the N iteration. For these blocks, not only inverse matrices do not need to be updated, but also additional matrices do not need to be updated. In this case, when the P blocks whose inverse matrices need to be updated are selected, the (Q-M) blocks whose additional matrices basically do not change can be directly excluded, and selection is directly performed on the M blocks whose additional matrices further need to be updated. This can further reduce training time of the neural network model.

In a possible implementation of the first aspect, the obtaining the P blocks from M blocks in the neural network model based on information about additional matrices of the M blocks includes: obtaining the P blocks from the M blocks based on a trace of additional matrices of the M blocks in the N iteration and a trace of additional matrices of the M blocks in the $(N-1)^{th}$ iteration.

In this possible implementation, the P blocks whose inverse matrices need to be updated are obtained based on the traces of the additional matrices of the M blocks in two iterations before and after, which can improve selection accuracy of the blocks.

In a possible implementation of the first aspect, the obtaining the P blocks from the M blocks based on a trace of additional matrices of the M blocks in the $N^{th}$ iteration and a trace of additional matrices of the M blocks in the $(N-1)^{th}$ iteration includes: obtaining the P blocks whose first ratio is greater than a first threshold from the M blocks, where the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

In this possible implementation, a relationship between the first ratio and the first threshold may be expressed by using a relation formula $$\frac{tr(F^N) - tr(F^{(N-1)})}{tr(F^{(N-1)})} > T1,$$

where $F^N$ represents the additional matrix in the $N^{th}$ iteration, $F^{(N-1)}$ represents the additional matrix in the $(N-1)^{th}$ iteration, $tr(F^N)$ represents the trace of the matrix $F^N$, $tr(F^{(N-1)})$ represents the trace of the matrix $F^{(N-1)}$, $tr(F^N)-tr(F^{(N-1)})$ represents the first difference, $$\frac{tr(F^N) - tr(F^{(N-1)})}{tr(F^{(N-1)})}$$

represents the first ratio, and T1 represents the first threshold. A value of T1 may be set to 0.01. If the first ratio of an additional matrix of a block is greater than 0.01, it indicates that an inverse matrix of the block needs to be updated. If the first ratio of an additional matrix of a block is less than 0.01, it indicates that an inverse matrix of the block does not need to be updated. It can be learned from this possible implementation that, whether an inverse matrix of a corresponding block needs to be updated may be determined based on a trace of an additional matrix of each block in the iteration process, which can improve selection accuracy of a block whose inverse matrix needs to be updated.

In a possible implementation of the first aspect, the method further includes: obtaining the P blocks from a plurality of blocks in the neural network model based on sampling probabilities of the plurality of blocks, where a sampling probability of a block is used to indicate a probability that an inverse matrix of an additional matrix of the block is updated in the $N^{th}$ iteration.

In this possible implementation, the block whose inverse matrix needs to be updated is selected based on the sampling probability of the block, which can improve a selection speed of the block.

In a possible implementation of the first aspect, the sampling probability of one of the plurality of blocks is related to a quantity of parameters in the block and a total quantity of parameters in the neural network model. Alternatively, the sampling probabilities of the plurality of blocks are preconfigured.

In this possible implementation, each block has a different influence on a training process. In this case, a sampling probability of each block is also different. A block with a larger quantity of parameters has a greater influence on the training process. The sampling probability of each block may be determined based on $$\frac{w_i}{\sum_j w_j},$$

where $w_i$ represents a quantity of parameters of an $i^{th}$ block, and $\Sigma_j w_j$ represents the total quantity of parameters in the neural network model. It can be learned from this possible implementation that, the sampling probability is determined based on the quantity of parameters in the block, which is more beneficial to increase a selection probability of a block with a large influence on the neural network model.

In a possible implementation of the first aspect, the method further includes: updating the inverse matrix when a second difference in the $N^{th}$ iteration is equal to an update start value, where the second difference is a difference between N and a total length of a previous iteration period, the previous iteration period is located before the third iteration period in the execution sequence, and the update start value is used to indicate an iteration in which the inverse matrix is updated for the first time in the third iteration period.

In this possible implementation, an initial update iteration of an inverse matrix may be set for each iteration period. For example, the inverse matrix is updated in the first iteration in each iteration period. Then, the inverse matrix is updated once based on an update stride of the iteration period and a quantity of iterations indicated by each update stride. If the third iteration period is the first iteration period in all iteration periods, the inverse matrix needs to be updated provided that N=the update start value. If the third iteration period is the second iteration period, there is one previous iteration period. For example, a period 1 is from a step 1 to a step 200, and a period 2 is from a step 201 to a step 500. If N=201 and the update start value=1, the second difference=201−200=1, that is, the second difference is just equal to the update start value. In this case, it can be determined that a $201^{st}$ iteration is an iteration in which the inverse matrix is updated for the first time in the period 2. Certainly, the update start value is not limited to 1, or may be equal to 2 or another value, usually provided that the update start value is less than or equal to a minimum update stride in all update strides. It can be learned from this possible implementation that, whether the $N^{th}$ iteration is a start update iteration in the third iteration period can be quickly determined by using a specific mathematical relationship, which helps improve a training speed of the neural network model.

In a possible implementation of the first aspect, the method further includes: updating the inverse matrix when a first remainder in the $N^{th}$ iteration is 0, where the first remainder is a remainder between a third difference and the third update stride, the third difference is a difference between an (N–an update start value) and a total length of a previous iteration period, the previous iteration period is located before the third iteration period in the execution sequence, and the update start value is used to indicate an iteration in which the inverse matrix is updated for the first time in the third iteration period.

In this possible implementation, when the $N^{th}$ iteration is executed, it may be determined, based on N, information about an iteration period, and an update stride, whether the inverse matrix needs to be updated in the $N^{th}$ iteration. If the third iteration period is the first iteration period in all the iteration periods, it may be determined whether the inverse matrix is updated in the $N^{th}$ iteration by using a relation formula: (N–the update start value) % a value of the third update stride, where "%" represents taking a remainder. For example, the period 1 is from the step 1 to the step 200. If N=5, the update start value=1, and the third update stride=1, (5–1)%1=0, which indicates that the inverse matrix needs to be updated in the fifth iteration. If the update start value=1, the third update stride=2, and N=6, (6–1)%2=1, which indicates that the inverse matrix does not need to be updated in the sixth iteration. If there is another iteration period before the third iteration period, all iteration periods executed before the third iteration period are referred to as previous iteration periods. For example, the period 1 is from the step 1 to the step 200, and the period 2 is from the step 201 to the step 500. If N=205, it indicates that the third iteration period is the period 2, and the period 1 is the previous iteration period. The total length of the previous iteration period is 200. For a case in which the N iteration is not in the first iteration period, it can be determined whether the inverse matrix is updated in the $N^{th}$ iteration by using a relation formula: (N–X–the third difference) % a value of the third update stride, where "%" represents taking a remainder, and the third difference=(N–the total length of the previous iteration period). If the update start value=1, an update stride of the period 2 is equal to 2, and N=205, (205–1–200)/2=0, which indicates that the first remainder is equal to 0, and the inverse matrix needs to be updated in the $205^{th}$ iteration. It can be learned from this possible implementation that, whether the inverse matrix of the additional matrix needs to be updated can be quickly determined by using a specific mathematical relationship, which helps improve a training speed of the neural network model.

A second aspect of this application provides a parameter updating method. The parameter updating method is used to update a parameter in a neural network model for a plurality of times through a plurality of iterations. For an $N^{th}$ iteration in the plurality of iterations, N is an integer greater than 1. The method includes: updating inverse matrices of additional matrices of P blocks, where the P blocks are some or all of Q blocks of the neural network model, P and Q are integers, Q≥P, Q≥2, and P≥1; updating a parameter of a corresponding block in the P blocks by using updated inverse matrices of the additional matrices of the P blocks, and a first-order gradient of the P blocks in the $N^{th}$ iteration; and if Q>P, for (Q–P) blocks other than the P blocks, updating a parameter of a corresponding block in the (Q–P) blocks by using inverse matrices of additional matrices used by the (Q–P) blocks in an $(N-1)^{th}$ iteration, and a first-order gradient of the (Q–P) blocks in the $N^{th}$ iteration.

In the second aspect, an idea of block-based update is proposed, and neurons in the neural network model may be divided into at least two blocks, and then an inverse matrix of an additional matrix of a corresponding block is updated based on the blocks. A concept of the "block" may be a set of vector relationships of neurons between two adjacent layers in the neural network model, and the set may alternatively be referred to as a "layer". A division manner of the block is not limited to division based on layers, and may be division based on the neurons in the neural network model. In this division manner, 1.5 layers, two layers, or more layers may form one block. When the inverse matrix is updated based on the blocks, all blocks or some of the blocks may be updated. Usually, at the beginning of model training, all the blocks are updated. As a quantity of iterations increases, a quantity of blocks in which inverse matrices need to be updated is reduced. If Q=8 and P=3, inverse matrices of additional matrices of three blocks are updated, parameters of the three blocks are updated by using updated inverse matrices, inverse matrices of the other five blocks are not updated, and parameters of this time are updated by using inverse matrices used in a previous iteration. It can be learned from this possible implementation that, based on the block-based update, an inverse matrix of an additional matrix of only at least one block is updated. In this way, time overheads of updating the inverse matrix of the additional matrix can be reduced, thereby reducing training time of the neural network model, and improving a training speed of the neural network model.

In a possible implementation of the second aspect, the method further includes: obtaining the P blocks from M blocks in the neural network model based on information about additional matrices of the M blocks, where the information about the additional matrix includes a trace of the additional matrix or a 2-norm of the additional matrix, the M blocks are blocks that are in the Q blocks in the $N^{th}$ iteration and whose additional matrices need to be updated, M is an integer, and Q≥M≥P.

In this possible implementation, the trace of the additional matrix is a sum of values on a diagonal of the additional matrix. The 2-norm of the additional matrix is an extraction of square root of a maximum eigenvalue after a transposition of the additional matrix is multiplied by the additional matrix. The additional matrix is an equal-row and equal-column matrix, which may also be referred to as a positive-definite matrix. If the additional matrix is a matrix of 8 rows-8 columns, the additional matrix includes 64 values. A sum of 8 values on a diagonal line of the matrix may be referred to as a trace of the additional matrix. The additional matrices of the M blocks in the Q blocks further need to be updated. (Q–M) blocks other than the M blocks are blocks that basically do not change in the N iteration. For these blocks, not only inverse matrices do not need to be updated, but also additional matrices do not need to be updated. In this case, when the P blocks whose inverse matrices need to be updated are selected, the (Q–M) blocks whose additional matrices basically do not change can be directly excluded, and selection is directly performed on the M blocks whose additional matrices further need to be updated. This can further reduce training time of the neural network model.

In a possible implementation of the second aspect, the obtaining the P blocks from M blocks in the neural network model based on information about additional matrices of the M blocks includes: obtaining the P blocks from the M blocks based on a trace of additional matrices of the M blocks in the $N^{th}$ iteration and a trace of additional matrices of the M blocks in the $(N-1)^{th}$ iteration.

In this possible implementation, the P blocks whose inverse matrices need to be updated are obtained based on the traces of the additional matrices of the M blocks in two iterations before and after, which can improve selection accuracy of the blocks.

In a possible implementation of the second aspect, the obtaining the P blocks from the M blocks based on a trace of additional matrices of the M blocks in the $N^{th}$ iteration and a trace of additional matrices of the M blocks in the $(N-1)^{th}$ iteration includes: obtaining the P blocks whose first ratio is greater than a first threshold from the M blocks, where the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

In this possible implementation, a relationship between the first ratio and the first threshold may be expressed by using a relation formula $$\frac{tr(F^N) - tr(F^{(N-1)})}{tr(F^{(N-1)})} > T1,$$

where $F^N$ represents the additional matrix in the $N^{th}$ iteration, $F^{(N-1)}$ represents the additional matrix in the $(N-1)^{th}$ iteration, $tr(F^N)$ represents the trace of the matrix $F^N$, $tr(F^{(N-1)})$ represents the trace of the matrix $F^{(N-1)}$, $tr(F^N)-tr(F^{(N-1)})$ represents the first difference, $$\frac{tr(F^N) - tr(F^{(N-1)})}{tr(F^{(N-1)})}$$

represents the first ratio, and T1 represents the first threshold. A value of T1 may be set to 0.01. If the first ratio of an additional matrix of a block is greater than 0.01, it indicates that an inverse matrix of the block needs to be updated. If the ratio of an additional matrix of a block is less than 0.01, it indicates that an inverse matrix of the block does not need to be updated. It can be learned from this possible implementation that, whether an inverse matrix of a corresponding block needs to be updated may be determined based on a trace of an additional matrix of each block in an iteration process, which can improve selection accuracy of a block whose inverse matrix needs to be updated.

In a possible implementation of the second aspect, the method further includes: obtaining the P blocks from a plurality of blocks in the neural network model based on sampling probabilities of the plurality of blocks, where a sampling probability of a block is used to indicate a probability that an inverse matrix of an additional matrix of the block is updated in the $N^{th}$ iteration.

In this possible implementation, the block whose inverse matrix needs to be updated is selected based on the sampling probability of the block, which can improve a selection speed of the block.

In a possible implementation of the second aspect, the sampling probability of one of the plurality of blocks is related to a quantity of parameters in the block and a total quantity of parameters in the neural network model. Alternatively, the sampling probabilities of the plurality of blocks are preconfigured.

In this possible implementation, each block has a different influence on a training process. In this case, a sampling probability of each block is also different. A block with a larger quantity of parameters has a greater influence on the training process. The sampling probability of each block may be determined based on $$\frac{w_i}{\sum_j w_j},$$

where $w_i$ represents a quantity of parameters of an $i^{th}$ block, and $\Sigma_j w_j$ represents the total quantity of parameters in the neural network model. It can be learned from this possible implementation that, the sampling probability is determined based on the quantity of parameters in the block, which is more beneficial to increase a selection probability of a block with a large influence on the neural network model.

A third aspect of this application provides a parameter updating apparatus, and the parameter updating apparatus has a function of implementing the method according to any one of the first aspect or the possible implementations of the first aspect. The function may be implemented by hardware, or may be implemented by hardware executing corresponding software. The hardware or the software includes one or more modules corresponding to the foregoing function, for example, a first processing unit, a second processing unit, and a third processing unit. Functions of the three processing units may be implemented by one processing unit, or may be implemented by two or three processing units.

A fourth aspect of this application provides a parameter updating apparatus, and the parameter updating apparatus has a function of implementing the method according to any one of the second aspect or the possible implementations of the second aspect. The function may be implemented by hardware, or may be implemented by hardware executing corresponding software. The hardware or the software includes one or more modules corresponding to the foregoing function, for example, a first processing unit, a second processing unit, and a third processing unit. Functions of the three processing units may be implemented by one processing unit, or may be implemented by two or three processing units.

A fifth aspect of this application provides a computer device, and the computer device includes: at least one processor, a memory, an input/output (input/output, I/O) interface, and computer-executable instructions that are stored in the memory and that can run on the processor. When the computer-executable instructions are executed by the processor, the processor performs the method according to any one of the first aspect or the possible implementations of the first aspect.

A sixth aspect of this application provides a computer device, and the computer device includes: at least one processor, a memory, an input/output (input/output, I/O) interface, and computer-executable instructions that are stored in the memory and that can run on the processor. When the computer-executable instructions are executed by the processor, the processor performs the method according to any one of the second aspect or the possible implementations of the second aspect.

A seventh aspect of this application provides a computer-readable storage medium storing one or more computer-executable instructions. When the one or more computer-executable instructions are executed by a processor, the processor performs the method according to any one of the first aspect or the possible implementations of the first aspect.

An eighth aspect of this application provides a computer-readable storage medium storing one or more computer-executable instructions. When the one or more computer-executable instructions are executed by a processor, the processor performs the method according to any one of the second aspect or the possible implementations of the second aspect.

A ninth aspect of this application provides a computer program product storing one or more computer-executable instructions. When the one or more computer-executable instructions are executed by a processor, the processor performs the method according to any one of the first aspect or the possible implementations of the first aspect.

A tenth aspect of this application provides a computer program product storing one or more computer-executable instructions. When the one or more computer-executable instructions are executed by a processor, the processor performs the method according to any one of the second aspect or the possible implementations of the second aspect.

An eleventh aspect of this application provides a system on chip, and the system on chip includes a processor, configured to support a parameter updating apparatus to implement a function according to any one of the first aspect or the possible implementations of the first aspect. In a possible design, the system on chip may further include a memory, and the memory is configured to store program instructions and data that are necessary for the parameter updating apparatus. The chip system may include a chip, or may include a chip and another discrete component.

A twelfth aspect of this application provides a system on chip, and the system on chip includes a processor, configured to support a parameter updating apparatus to implement a function according to any one of the second aspect or the possible implementations of the second aspect. In a possible design, the system on chip may further include a memory, and the memory is configured to store program instructions and data that are necessary for the parameter updating apparatus. The chip system may include a chip, or may include a chip and another discrete component.

For technical effects brought by any one of the third aspect, the fifth aspect, the seventh aspect, the ninth aspect, and the eleventh aspect, or any possible implementation thereof, refer to the technical effects brought by the first aspect or the different possible implementations of the first aspect. Details are not described herein.

For technical effects brought by any one of the fourth aspect, the sixth aspect, the eighth aspect, the tenth aspect, and the twelfth aspect, or any possible implementation thereof, refer to the technical effects brought by the second aspect or the different possible implementations of the second aspect. Details are not described herein.

In the embodiments of this application, based on the step-based update, the inverse matrix of the additional matrix of the neural network model is updated once based on the quantity of iterations indicated by each update stride, and it is not necessary to update the inverse matrix in each iteration. In this way, time overheads of updating the inverse matrix of the additional matrix can be reduced, thereby reducing training time of the neural network model, and improving a training speed of the neural network model.

In addition, based on the block-based update used in the embodiments of this application, the inverse matrices of the additional matrices of all the blocks or some of the blocks can be updated based on the requirement. In this way, time overheads of updating the inverse matrix can be reduced, thereby reducing training time of the neural network model, and improving a training speed of the neural network model.

DESCRIPTION OF EMBODIMENTS

The following describes the embodiments of this application with reference to the accompanying drawings. It is clearly that the described embodiments are merely some rather than all of the embodiments of this application. It can be learned by a person of ordinary skill in the art that, with development of technologies and emergence of a new scenario, the technical solutions provided in the embodiments of this application are also applicable to similar technical problems.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Embodiments of this application provide a parameter updating method, to shorten time for updating a parameter in a neural network model. Embodiments of this application further provide a corresponding apparatus and a storage medium. Details are separately described in the following.

Artificial intelligence (artificial intelligence, AI) is a comprehensive technology of computer science and attempts to understand an essence of intelligence and produce a new intelligent machine that can react in a manner similar to human intelligence. The artificial intelligence is to study design principles and implementation methods of various intelligent machines, so that the machines can perceive, reason, and make decisions.

Figure 1:
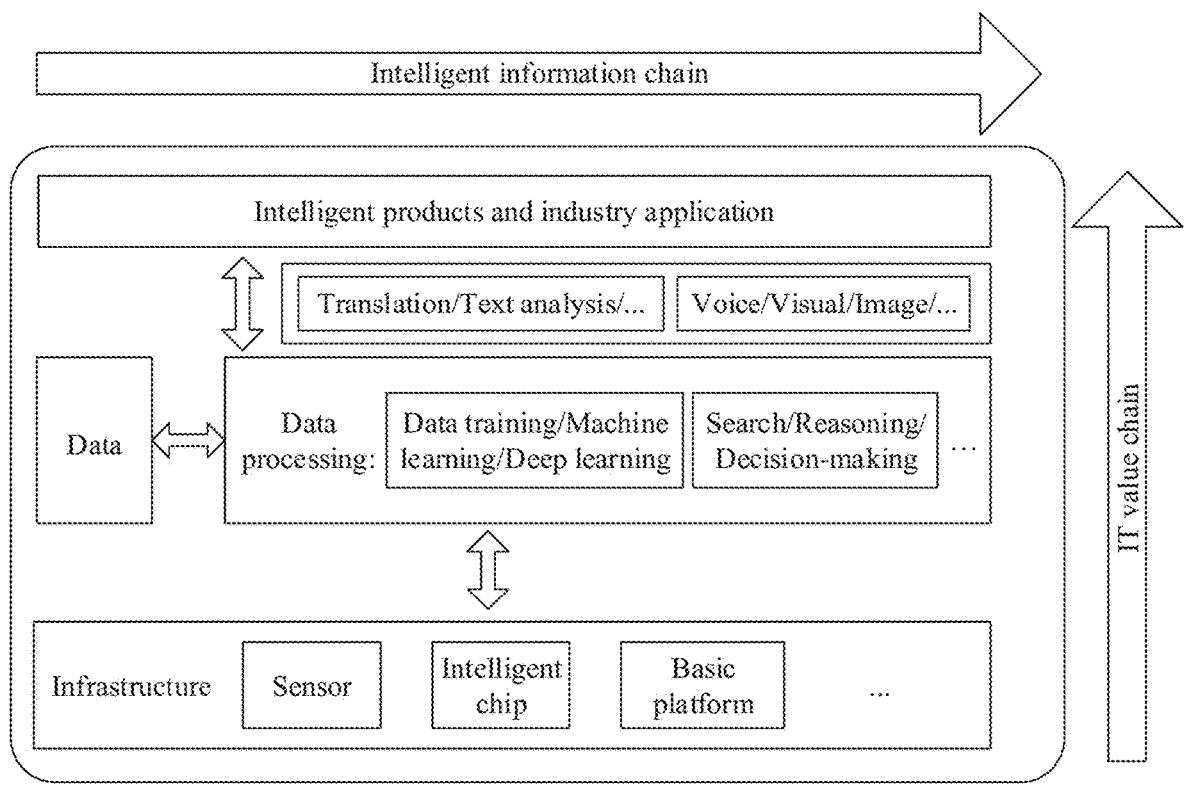
FIG. 1 is a schematic diagram of an artificial intelligence body framework.

FIG. 1 is a schematic diagram of an artificial intelligence body framework. The body framework describes an overall working procedure of an artificial intelligence system, and is applicable to a general requirement of the field of artificial intelligence.

The artificial intelligence body framework is described from two dimensions: an "intelligent information chain" (a horizontal axis) and an "IT value chain" (a vertical axis).

The "intelligent information chain" reflects a series of processes from data obtaining to processing, for example, a general process of intelligent information awareness, intelligent information representation and formation, intelligent reasoning, intelligent decision-making, and intelligent execution and output. In this process, data experiences a condensing process of "data-information-knowledge-wisdom".

The "IT value chain", from underlying infrastructure of artificial intelligence and information (providing and processing technology implementation) to an industrial ecological process of a system, reflects value that the artificial intelligence brings to an information technology industry.

(1) Infrastructure

The infrastructure provides, by using a basic platform, computing capability support for an artificial intelligence system, to implement communication with an external world. The infrastructure communicates with the external by using a sensor. A computing capability is provided by an intelligent chip (a hardware acceleration chip, for example, a central processing unit (CPU), a neural-network processing unit (NPU), a graphics processing unit (GPU), an application-specific integrated circuit (ASIC), or a field-programmable gate array (FPGA)). The basic platform includes platform assurance and support related to, for example, a distributed computing framework and a network, and may include cloud storage and computing, an interconnection and interworking network, and the like. For example, the sensor communicates with the external to obtain data that is provided for computing by an intelligent chip in a distributed computing system provided by the basic platform.

(2) Data

Data at an upper layer of the infrastructure is used to represent a data source in the field of artificial intelligence. The data relates to a graph, an image, a voice, and a text, and also relates to Internet of things data of a conventional device, including service data of an existing system and perception data such as force, displacement, a liquid level, a temperature, and humidity.

(3) Data processing

Data processing usually includes data training, machine learning, deep learning, searching, reasoning, decision-making, and the like.

Machine learning and deep learning can perform symbolized and formalized intelligent information modeling, extraction, pre-processing, training, and the like on data.

Reasoning refers to a process in which a computer or an intelligent system simulates an intelligent reasoning manner of a human being, and uses formalized information to perform machine thinking and resolve a problem according to a reasoning control policy. A typical function is searching and matching.

Decision-making refers to a process in which intelligent information is inferred for decision-making, and usually provides functions such as classification, sorting, and prediction.

(4) General Capability

After the foregoing data processing is performed on the data, a general capability, for example, translation, text analysis, computer vision processing, voice recognition, and image recognition, may be further implemented based on a result of data processing, for example, may be an algorithm or a general-purpose system.

(5) Intelligent Products and Industry Applications

The intelligent products and the industry applications refer to products and applications of the artificial intelligence system in various fields, and mean encapsulation of an entire solution of artificial intelligence and productization and applications of an intelligent information decision. Application fields of the intelligent products mainly include: intelligent manufacturing, intelligent transportation, a smart household, intelligent medical, intelligent security protection, automated driving, an intelligent terminal, intelligent marketing, and an intelligent customer service.

In any application of artificial intelligence, a neural network model is used, for example, a deep neural network (DNN) model or a convolutional neural network (CNN) model. A target neural network model applicable to this service scenario can be obtained by training an initial neural network model by using sample data in different fields or service scenarios. The sample data may be image data, voice data, text data, or the like, and a type of the sample data is determined based on a field to which the neural network model is applicable. For example, when the neural network model is used in the automated driving field, the sample data may be various image data in a traffic scenario, such as an image of a building, an image of a pedestrian, an image of a vehicle, an image of a ground identifier, and an image of a traffic light around an automated driving vehicle. When the neural network model is used in intelligent security protection or a safe city, the sample data may be various image data of a city, such as an image of each block of the city. When the neural network model is used in another service scenario, the sample data is data of types such as an image, an audio, or a text of a corresponding service scenario. A training process of the neural network model may be performed in a system architecture 200 shown in FIG. 2.

Figure 2:
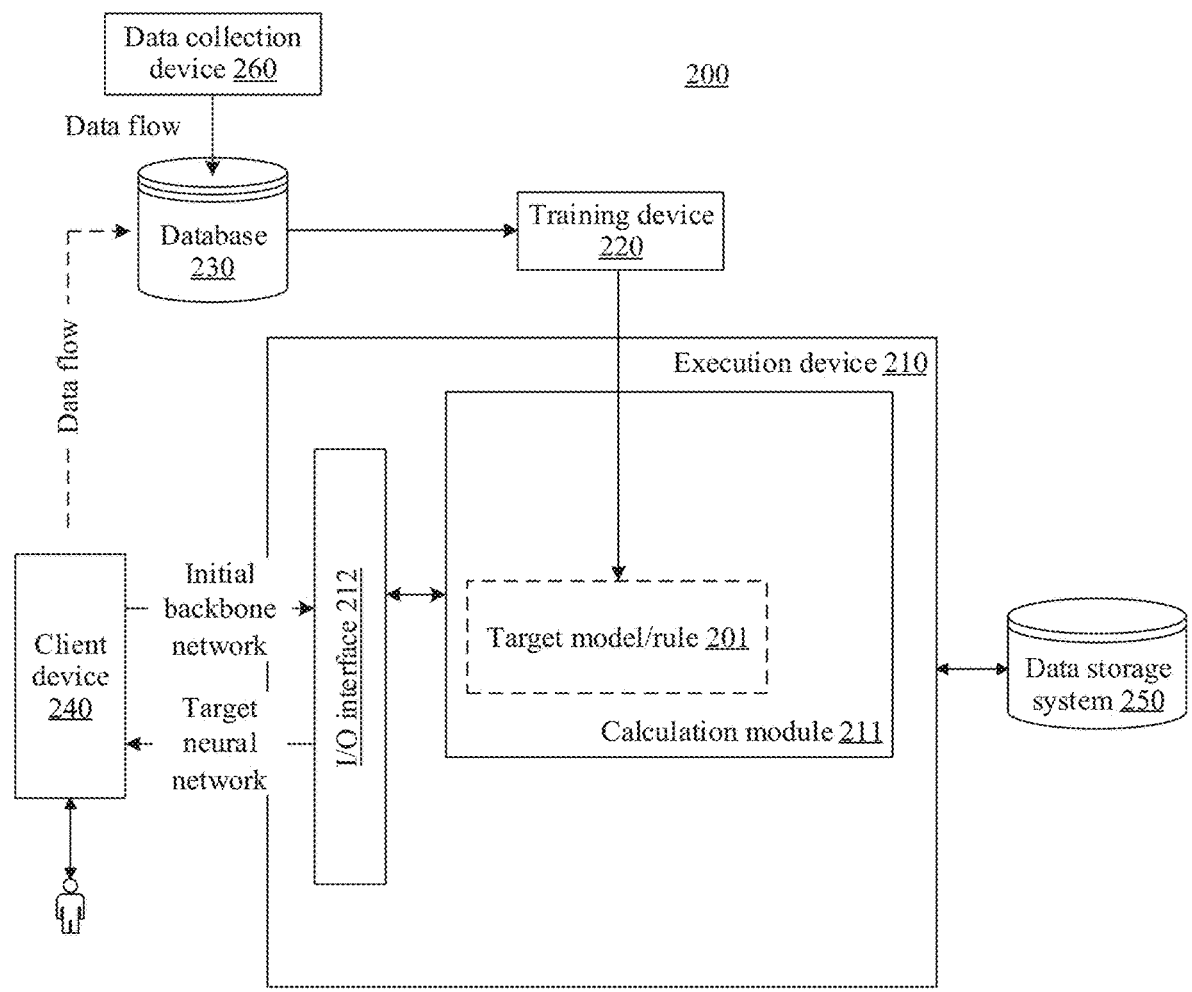
FIG. 2 is a schematic diagram of a system architecture according to an embodiment of this application.

With reference to FIG. 2, an embodiment of this application provides a system architecture 200. A data collection device 260 is configured to collect sample data used for training a neural network model and store the sample data in a database 230. For the sample data, refer to the foregoing description of the sample data. Details are not described herein. A training device 220 generates a target neural network model/rule 201 based on sample data maintained in the database 230. The following describes in more detail how the training device 220 obtains the target neural network model/rule 201 based on the sample data. For example, the target neural network model/rule 201 can instruct, an automated driving vehicle to drive automatically or recognize automatically an unsafe factor.

An operation of each layer in a deep neural network model may be described with a mathematical expression y=a(W·x+b). W is a weight vector, and each value in the vector represents a weight value of one neuron on this layer of the neural network. The vector W determines the above-described spatial transformation from an input space to an output space, that is, a weight W of each layer controls how the space is transformed. A purpose of training a deep neural network model is to finally obtain a weight matrix (a weight matrix formed by vectors W of a plurality of layers) of all layers of a trained neural network. Therefore, a training process of the neural network model is essentially learning a manner to control space transformation, and more specifically, learning the weight matrix.

"A difference between a predicted value and a target value of the neural network model" is a loss function or an objective function.

The target neural network model/rule obtained by the training device 220 may be applied to different systems or devices. In FIG. 2, an execution device 210 is provided with an I/O interface 212, to exchange data with an external device. A "user" may input data to the I/O interface 212 by using a client device 240.

The execution device 210 may invoke data, code, and the like in a data storage system 250, and may store data, instructions, and the like in the data storage system 250.

The calculation module 211 processes input data by using the target neural network model/rule 201. For example, in an automated driving field, an obstacle and the like during automated driving are recognized from image data of a traffic scenario by using the target neural network model/rule 201.

Finally, the I/O interface 212 returns a processing result to the client device 240 to provide the processing result to the user.

In addition, the training device 220 can generate corresponding target neural network models/rules 201 based on sample data of different service scenarios for different targets, to provide good results for the user.

It should be noted that, FIG. 2 is only a schematic diagram of a system architecture according to an embodiment of this application. A location relationship between a device, a component, a module, and the like shown in FIG. 2 constitutes no limitation. For example, in FIG. 2, the data storage system 250 is an external memory relative to the execution device 210, and in another case, the data storage system 250 may be disposed in the execution device 210.

The convolutional neural network model may also be briefly referred to as a convolutional neural network, is a deep neural network with a convolutional structure, and is a deep learning (deep learning) architecture. The deep learning architecture refers to learning a plurality of layers at different abstract layers by using an algorithm of machine learning. As a deep learning architecture, the CNN is a feed-forward (feed-forward) artificial neural network, and each neuron in the feed-forward artificial neural network responds to an overlapping area in images input into the neuron.

Figure 3:
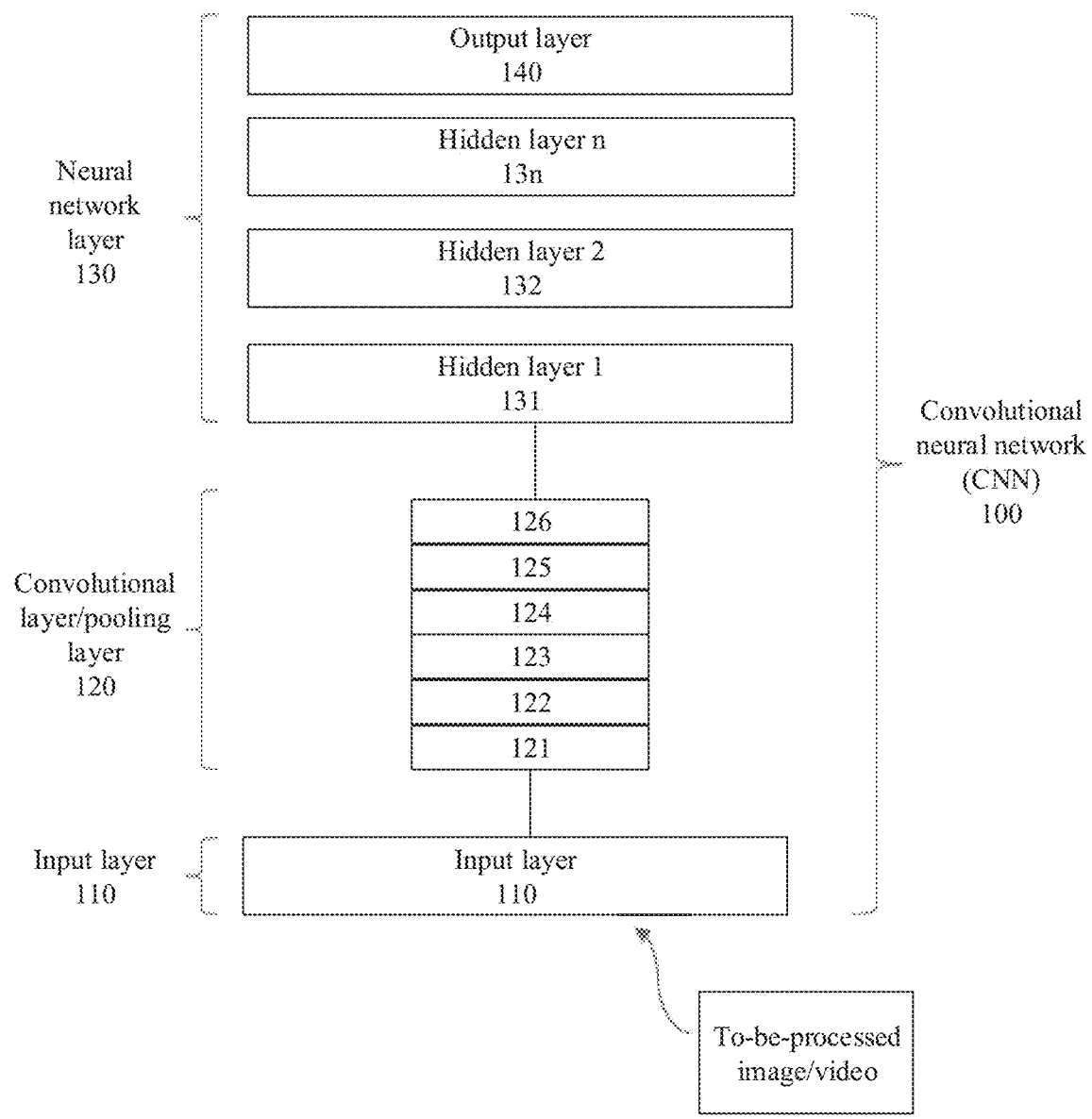
FIG. 3 is a schematic diagram of a structure of a convolutional neural network.

As shown in FIG. 3, a convolutional neural network (CNN) 100 may include an input layer 110, a convolutional layer/pooling layer 120, where the pooling layer is optional, and a neural network layer 130.

Convolutional Layer/Pooling Layer 120:

Convolutional Layer:

As shown in FIG. 3, the convolutional layer/pooling layer 120 may include, for example, layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layers 121 and 122 are convolutional layers, the layer 123 is a pooling layer, the layers 124 and 125 are convolutional layers, and the layer 126 is a pooling layer. That is, an output of the convolutional layer may be used as an input of a subsequent pooling layer, or may be used as an input of another convolutional layer to continue a convolution operation.

The convolutional layer 121 is used as an example. The convolutional layer 121 may include a plurality of convolution operators. The convolution operator is also referred to as a core. A function of the convolution operator in image processing is equivalent to a filter that extracts specific information from an input image matrix. The convolution operator may essentially be a weight matrix, and the weight matrix is usually predefined.

Weight values in these weight matrices need to be obtained through a large amount of training in actual application. Each weight matrix formed by the weight values obtained through training may extract information from an input image, to help the convolutional neural network model 100 correctly predict.

Pooling Layer:

A quantity of training parameters often needs to be reduced. Therefore, a pooling layer usually needs to be periodically introduced after a convolutional layer. To be specific, for the layers 121 to 126 exemplified by 120 in FIG. 3, one convolutional layer may be followed by one pooling layer, or a plurality of convolutional layers may be followed by one or more pooling layers. During picture processing, the pooling layer is only used to reduce a space size of the picture.

Neural Network Layer 130:

After being processed by the convolutional layer/pooling layer 120, the convolutional neural network model 100 is not sufficient to output required output information. Because as described above, the convolutional layer/pooling layer 120 only extracts a feature and reduces a parameter brought by an input image. However, in order to generate final output information (information about a required class or other related information), the convolutional neural network model 100 needs to use the neural network layer 130 to generate output of one or a group of required classes. Therefore, the neural network layer 130 may include a plurality of hidden layers (131, and 132 to 13*n* shown in FIG. 3) and an output layer 140. Parameters included in the plurality of hidden layers may be obtained by pre-training based on related training data of a specific task type. For example, the task type may include image recognition, image classification, and image super-resolution reconstruction.

After the plurality of hidden layers in the neural network layer 130, a last layer of the entire convolutional neural network model 100 is the output layer 140. The output layer 140 has a loss function similar to classification cross-entropy, and is specifically configured to calculate a prediction error. Once forward propagation (as shown in FIG. 3, propagation from 110 to 140 is forward propagation) of the entire convolutional neural network model 100 is completed, backward propagation (as shown in FIG. 3, propagation from 140 to 110 is backward propagation) is started to update the weight value and a deviation of each layer described above, to reduce a loss of the convolutional neural network model 100 and an error between a result output by the convolutional neural network model 100 by using the output layer and an ideal result.

It should be noted that, the convolutional neural network model 100 shown in FIG. 3 is only an example of a convolutional neural network model. In specific application, the convolutional neural network model may further exist in a form of another network model. For example, a plurality of convolutional layers/pooling layers shown in FIG. 4 are parallel, and each extracted feature is input to the entire neural network layer 130 for processing.

Figure 4:
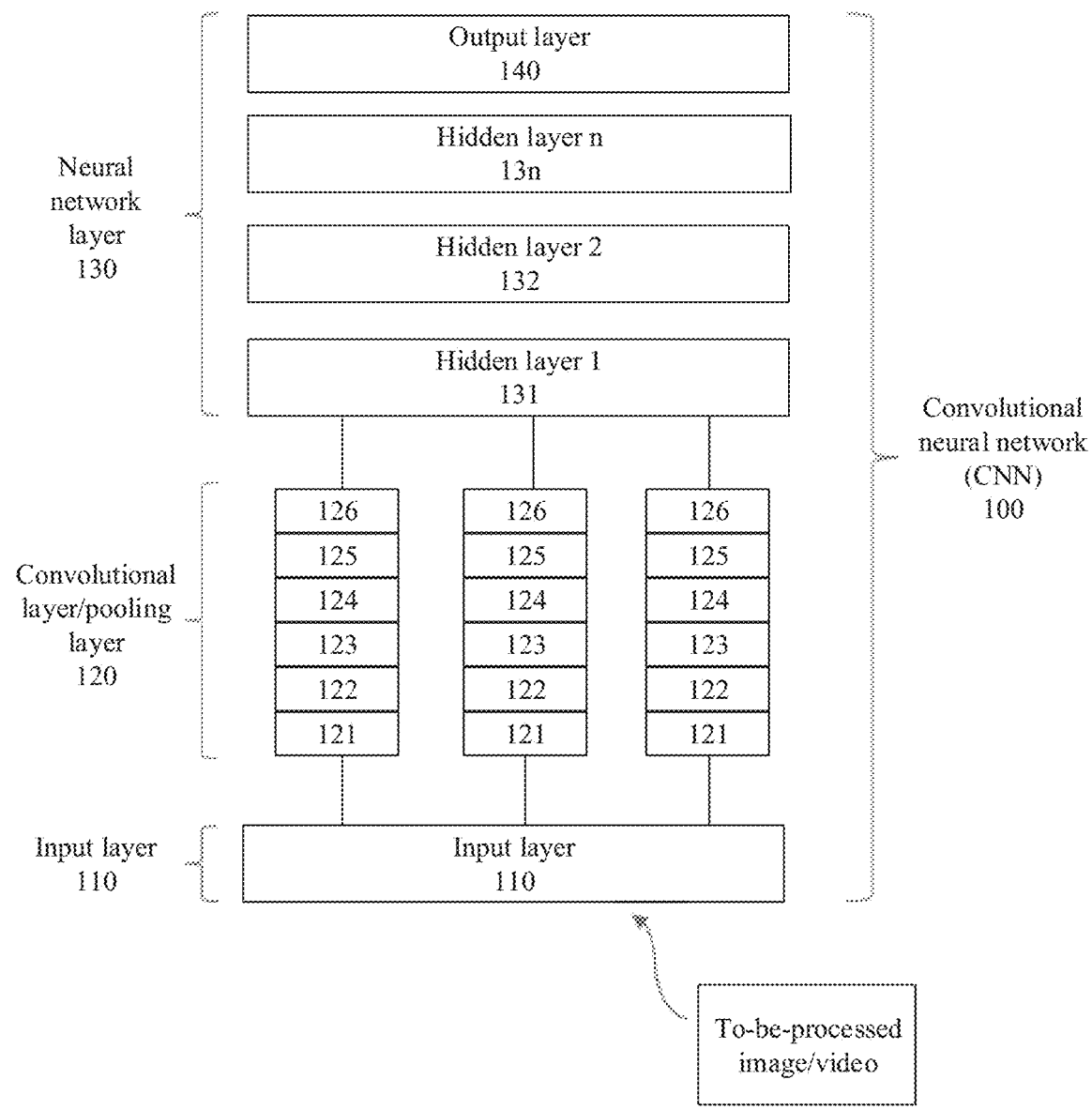
FIG. 4 is a schematic diagram of another structure of a convolutional neural network.

Algorithms based on the convolutional neural network models shown in FIG. 3 and FIG. 4 may be implemented in an NPU chip.

It can be learned from the foregoing description that, both the deep neural network model and the convolutional neural network model include weights. Actually, a training process of the neural network model is a process of continually updating a weight in the neural network model based on a plurality of iterations. During a training phase of the neural network model, the weight is a parameter that needs to be updated. In a model training process, in each iteration, a loss function of this iteration is calculated by using sample data. Next, first-order optimization is performed on the loss function to obtain a first-order gradient. Then, additional optimization is further performed on the first-order gradient. For example, second-order optimization is further performed on the first-order gradient, to obtain an update weight of this iteration. After that, the model is updated by using the update weight of this iteration. Last, a next iteration is performed on a model obtained after the weight is updated in this iteration, until an entire training process of the neural network model is completed.

A first-order optimization algorithm is used for the first-order optimization. An additional optimization algorithm is used for the additional optimization.

The first-order optimization algorithm usually updates a parameter by using the following rule: $\theta 2=\theta 1-\eta \nabla_{\theta 1}$. The additional optimization algorithm first multiplies $V_6$ by an inverse matrix $G^{-1}$ of an additional matrix G to generate the following update rule: $\theta 2=\theta 1-\eta G^{-1}\nabla_\theta$. $\theta 1$ is a parameter before updating (namely, a weight before updating). $\theta 2$ is an updated parameter (namely, an updated weight). $\eta$ is a learning rate, and the learning rate can be preconfigured. $\nabla_0$ is a first-order gradient of a parameter obtained by performing first-order derivation on a loss function. The additional matrix is a matrix that pre-processes a first-order gradient. The additional matrix may be a second-order information matrix or an approximate matrix in a second-order optimization algorithm. The second-order information matrix may include a Fisher matrix (Fisher Information Matrix, FIM) in a natural gradient method or a Hessian matrix in a Newton method. The additional matrix may alternatively be another additional matrix, for example, a second-order moment of a gradient. The second-order moment is a product of a first-order gradient and a transposition of the first-order gradient. The first-order gradient is a first-order derivative of a loss function to a parameter in the neural network model, and may be expressed as: $\nabla_\theta=df(x)/dx$, where $\nabla_0$ represents the first-order gradient, f(x) represents the loss function, x represents the parameter in the neural network model, and df(x)/dx represents the first-order derivative of the loss function to the parameter in the neural network model. It should be noted that, in the example listed herein, $G^{-1}$ is the inverse matrix of the additional matrix. Actually, it is not limited to this form of expression, provided that another deformation formula based on the idea of this application is applicable, for example, $\theta 2=\theta 1-\eta A\nabla_\theta B$, where $A\nabla_\theta B$ is equivalent to $G^{-1}\nabla_\theta$.

Considering of a large complexity and a long calculation time of an inverse matrix of an additional matrix during each iteration, to reduce training time of the neural network model, an embodiment of this application proposes a concept of "step-based update". The step-based update means that in the training process of the neural network model by using a plurality of iterations, an inverse matrix of an additional matrix needs to be updated only in a sampled iteration process, and an inverse matrix of an additional matrix does not need to be updated in an un-sampled iteration process.

In addition, with reference to the foregoing descriptions in FIG. 3 and FIG. 4, it can be learned that, the neural network model usually includes the input layer, the hidden layer, and the output layer. In addition, for example, there are usually a plurality of hidden layers. To reduce time for updating a parameter in the neural network model in the training process, this embodiment of this application further proposes a concept of "block-based update". The block-based update means that an inverse matrix of an additional matrix needs to be updated only for a sampled block, and an inverse matrix of an additional matrix does not need to be updated for an un-sampled block.

For ease of understanding the following, a concept of "block" in the block-based update is first described with reference to FIG. 5A and FIG. 5B.

Figure 5A:
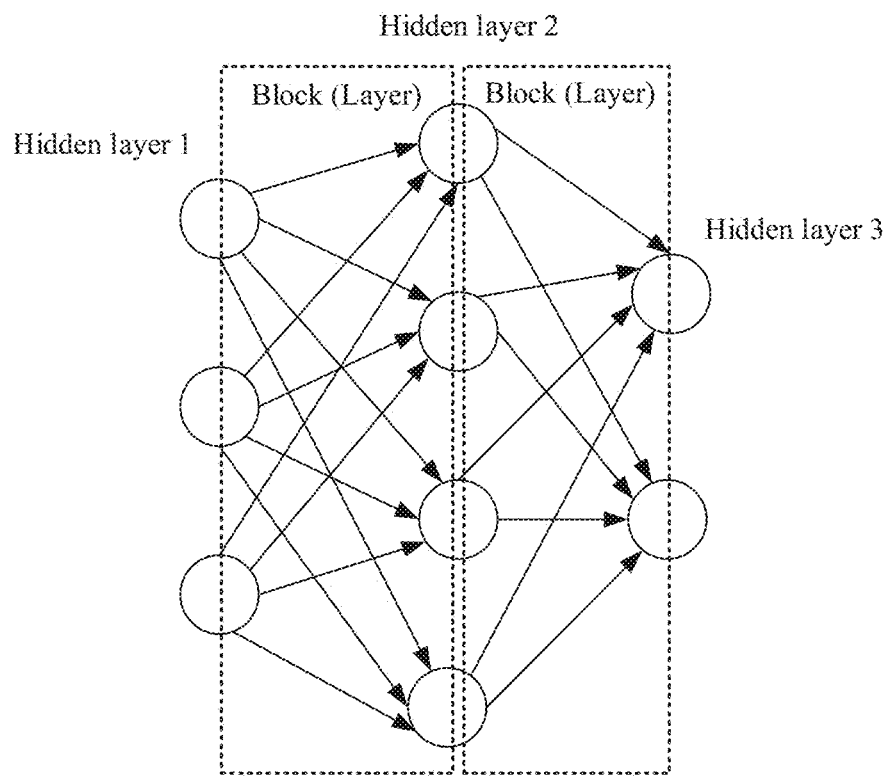
FIG. 5A is a schematic diagram of an example of block division according to an embodiment of this application.

As shown in FIG. 5A, for a complex neural network model, the concept of "block" refers to a vector relationship between neurons between two layers. As shown in FIG. 5A, a set of vector relationships that are between a hidden layer 1 and a hidden layer 2 and that are represented by arrows may be referred to as one "block", and in some descriptions, the set of vector relationships may alternatively be referred to as one "layer". A set of vector relationships that are between the hidden layer 2 and a hidden layer 3 and that are represented by arrows may be referred to as one "block", and in some descriptions, the set of vector relationships may alternatively be referred to as one "layer". Certainly, in FIG. 5A, the hidden layer 1, the hidden layer 2, and the hidden layer 3 are merely used as examples for description. Actually, more hidden layers, input layers, and output layers may be further included. Regardless of the hidden layer, the input layer, or the output layer, a set of vector relationships between every two adjacent layers that include neurons may be referred to as one "block" or one "layer".

A division manner of the block is not limited to division based on layers, and may be division based on neurons in the neural network model. In this division manner, for example, 1.5 layers, two layers, or more layers in FIG. 5A may form one block. Specifically, that neurons of which quantity of layers are divided into one block is not limited in this application. As shown in FIG. 5B, a "block" in this case refers to a matrix block divided in a manner of combining neurons in the neural network model. As shown in FIG. 5B, four 3×3-sized matrix blocks 601 and two 4×4-sized matrix blocks 602 are included.

Based on the foregoing ideas of the "step-based update" and the "block-based update", an embodiment of this application provides a system architecture for training a neural network model.

Figure 6:
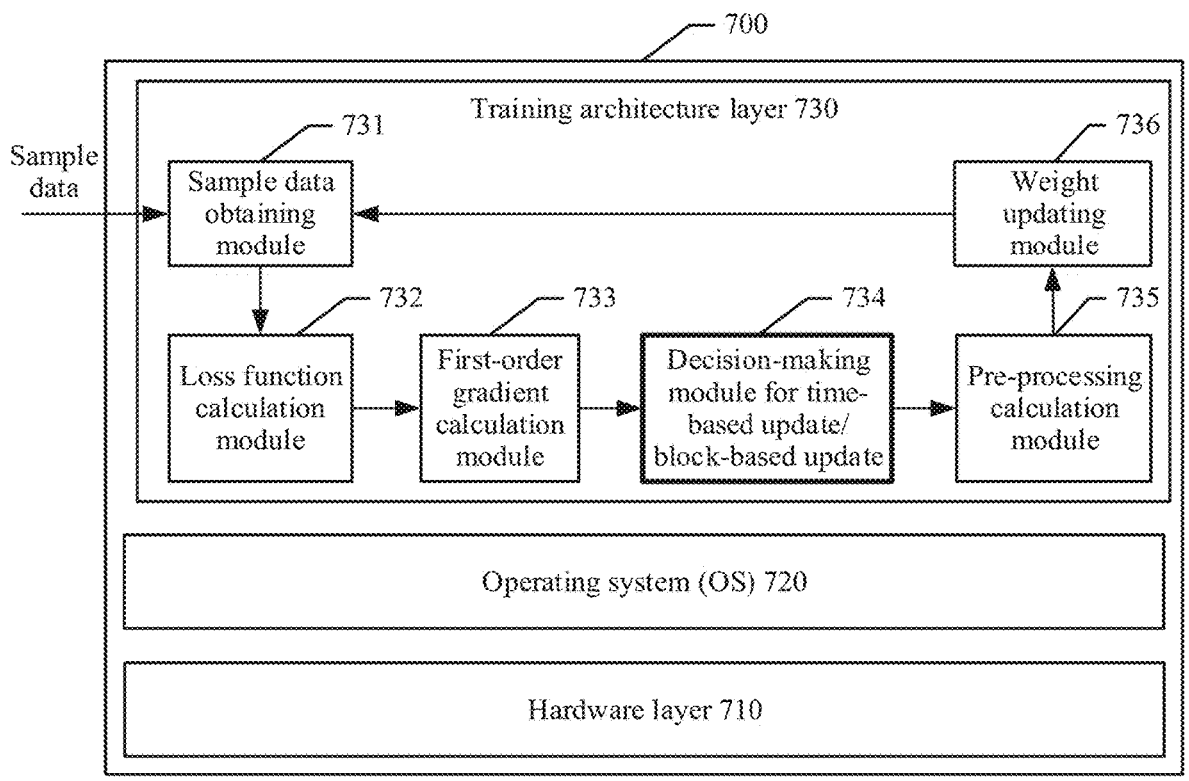
FIG. 6 is a schematic diagram of a system architecture configured to train a neural network model according to an embodiment of this application.

FIG. 6 is a schematic diagram of a system architecture configured to train a neural network model according to an embodiment of this application.

As shown in FIG. 6, a system architecture 700 that is used to train the neural network model and that is provided in this embodiment of this application includes a hardware layer 710, an operating system (operating system, OS) 720, and a training architecture layer 730. The training architecture layer 730 is configured to update a weight in the neural network model by using training data. The training architecture layer 730 includes a sample data obtaining module 731, a loss function calculation module 732, a first-order gradient calculation module 733, a decision-making module 734 for step-based update/block-based update, a pre-processing calculation module 735, and a weight updating module 736. The sample data obtaining module 731 to the weight updating module 736 herein all may be functional modules implemented by using software.

The sample data obtaining module 731 is configured to obtain sample data.

The loss function calculation module 732 is configured to calculate a loss function by using the sample data. The loss function is defined when the deep neural network model is described in FIG. 2. Details are not described herein.

The first-order gradient calculation module 733 is configured to perform first-order derivation on the loss function, to calculate a first-order gradient $\nabla_\theta$.

The decision-making module 734 for step-based update/block-based update has functions of a step-based update decision, a block-based update decision, and a step-based update decision-then-block-based update decision.

The step-based update decision means that an inverse matrix of an additional matrix needs to be updated only in an iteration process updated by a decision, and an inverse matrix of an additional matrix does not need to be updated in an iteration process not updated by a decision.

The block-based update decision means that an inverse matrix of an additional matrix needs to be updated only in a block updated by a decision, and an inverse matrix of an additional matrix does not need to be updated in a block not updated by a decision.

The step-based update decision-then-block-based update decision means that a block only in an iteration process updated by a decision has an opportunity to be made a block-based update decision.

Figure 5B:
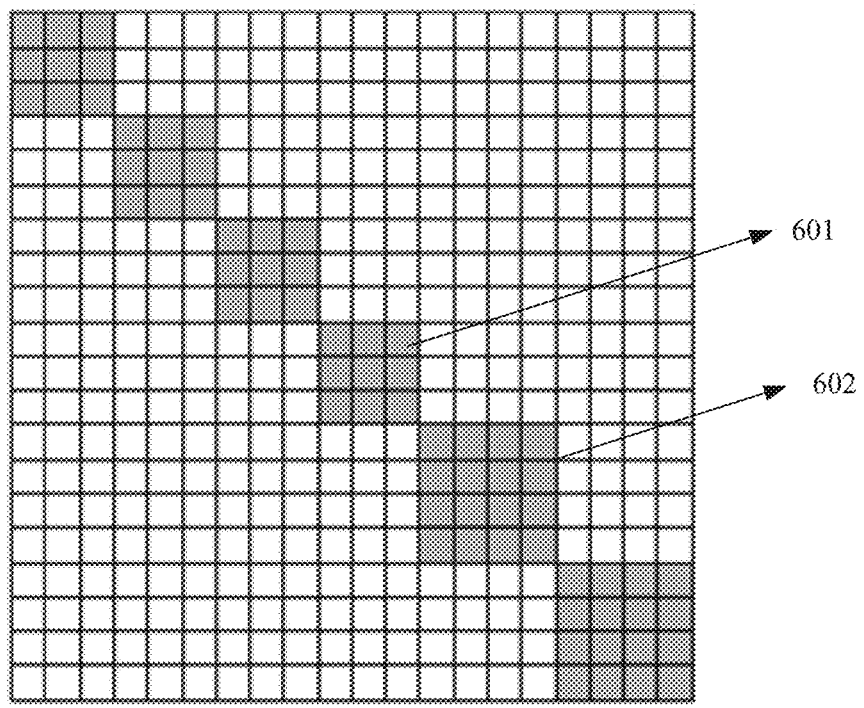
FIG. 5B is a schematic diagram of another example of block division according to an embodiment of this application.

For a "block" in block division herein, reference may be made to the foregoing corresponding descriptions in FIG. 5A and FIG. 5B. Details are not described herein.

The pre-processing calculation module 735 updates an inverse matrix of an additional matrix of a corresponding block only in an iteration process or a block determined by the decision-making module 734 for step-based update/block-based update to update, and then multiplies an updated inverse matrix $G^{-1}$ of the additional matrix of the block by the first-order gradient $\nabla_\theta$, to calculate a pre-processing result $G^{-1}\nabla_\theta$ of the block. In the iteration process updated by a decision, for a block that is not selected for updating, a pre-processing result is directly calculated by using an inverse matrix of an additional matrix of a corresponding block in a previous iteration process. In the iteration process not updated by a decision, an inverse matrix of an additional matrix of each block is not updated, and a pre-processing result is directly calculated by using an inverse matrix of an additional matrix of each block in a previous iteration process.

A process of updating the inverse matrix $G^{-1}$ of G may be obtained based on cholesky (cholesky) decomposition. A specific process of cholesky decomposition is not described in detail in this application.

The weight updating module 736 is configured to update a weight by using an update rule of a second-order optimization algorithm $\theta 2=\theta 1-\eta G^{-1}\nabla_\theta$, so that the weight is updated from $\theta 1$ to $\theta 2$. It should be noted that, in the example listed herein, $G^{-1}$ is the inverse matrix of the additional matrix. Actually, it is not limited to this form of expression, provided that another deformation formula based on the idea of this application is applicable, for example, $\theta 2=\theta 1-\eta A\nabla_\theta B$, where $A\nabla_\theta B$ is equivalent to $G^{-1}\nabla_\theta$.

It should be noted that, in this embodiment of this application, each block corresponds to one additional matrix, each block corresponds to one weight, and the weight may be in a form of a matrix. A weight of a block on which an inverse matrix of an additional matrix is updated is also updated. In this case, $\theta 2 \neq \theta 1$. A weight of a block on which an inverse matrix of an additional matrix that is not updated is not updated either. In this case, $\theta 2=\theta 1$.

After weight updating ends, the model is updated by using an update weight in this iteration. A next iteration is performed based on the model after the weight is updated in this iteration. For each iteration process, reference may be made to working processes of the foregoing several functional modules for understanding.

The system architecture 700 may be deployed on computer devices such as a server, a virtual machine, and a terminal device. For example, the terminal device may be a mobile phone, a pad, a computer with a wireless transceiver function, a virtual reality (VR) terminal, an augmented reality (AR) terminal, a wireless terminal in an industrial control system, a wireless terminal in self driving, a wireless terminal in remote medical, a wireless terminal in a smart grid, a wireless terminal in transportation safety, a wireless terminal in a smart city, a wireless terminal in a smart home, or the like.

It can be learned from the foregoing descriptions of the functional modules in the system architecture 700 that, a parameter updating method provided in this embodiment of this application includes: Solution 1: step-based update, Solution 2: block-based update, and Solution 3: step-based update+block-based update. The following describes the three solutions.

Solution 1: Step-Based Update

In the step-based update solution, viewed from an entire training process of the neural network model, the parameter updating method is used to update a parameter in the neural network model for a plurality of times through a plurality of iterations. The plurality of iterations include a first iteration period and a second iteration period. In an embodiment, the parameter updating method includes: updating, in the first iteration period, an inverse matrix of an additional matrix of the neural network model once based on a quantity of iterations indicated by each first update stride, where the first iteration period includes at least two iterations; and updating, in the second iteration period, the inverse matrix of the additional matrix of the neural network model once based on a quantity of iterations indicated by each second update stride, where the second iteration period includes at least two iterations, the first iteration of the second iteration period is after the last iteration of the first iteration period in an iteration sequence, and the second update stride is greater than the first update stride.

A process of training the neural network model by using sample data usually requires a plurality of iterations to obtain a target neural network model, and each iteration may be referred to as one step (step). The entire training process starts with the first iteration, and ends until all steps in the entire training process of obtaining the target neural network model may be divided into at least two iteration periods (period). For example, it takes 10,000 iterations to complete training of the neural network model, and the 10,000 times may be divided into 10 iteration periods. The 10 iteration periods are arranged from a period 1 to a period 10 based on a sequence in which the iteration periods are used in the iteration process, and each iteration period includes 1000 iterations. Certainly, this division manner is merely an example, and a length of the iteration period may be different. For example, a period 1 is from a step 1 to a step 200, a period 2 is from a step 201 to a step 500, a period 3 is from a step 501 to a step 1000, a period 4 is from a step 1001 to a step 1700, a period 5 is from a step 1701 to a step 2600, a period 6 is from a step 2601 to a step 3600, a period 7 is from a step 3601 to a step 4800, a period 8 is from a step 4801 to a step 6000, a period 9 is from a step 6001 to a step 7500, and a period 10 is from a step 7500 to a step 10000. If a convergence condition for training the neural network model is not a preset quantity of iterations, more iteration periods may be set to ensure that the set iteration periods are not used up when the neural network model converges. One iteration period may also be one epoch.

The first iteration period and the second iteration period may be any two of all iteration periods, provided that the second iteration period is after the first iteration period in an execution sequence. Each iteration period corresponds to one update stride (update stride). The update stride represents an update spacing, and represents that the inverse matrix of the additional matrix of the neural network model is updated once at each update stride; or the update stride may be described as that updating is performed once every (the update stride-1). The update stride may alternatively be referred to as an update interval (update interval). The update stride may be an integer value greater than or equal to 1. A change trend of the update stride may be that an update stride of a corresponding iteration period becomes greater as a quantity of iterations increases, or an update stride of an iteration period in a later execution sequence is greater than only an update stride of one or more iteration periods in a previous execution sequence, where update strides of some iteration periods may be equal. For example, a case in which an update stride of the first iteration period is 1, an update stride of the second iteration period is 2, an update stride of a third iteration period is 2, and an update stride of a fourth iteration period is 3. This case in which some update strides are equal may also be applicable to the step-based update solution in this application.

Figure 7A:
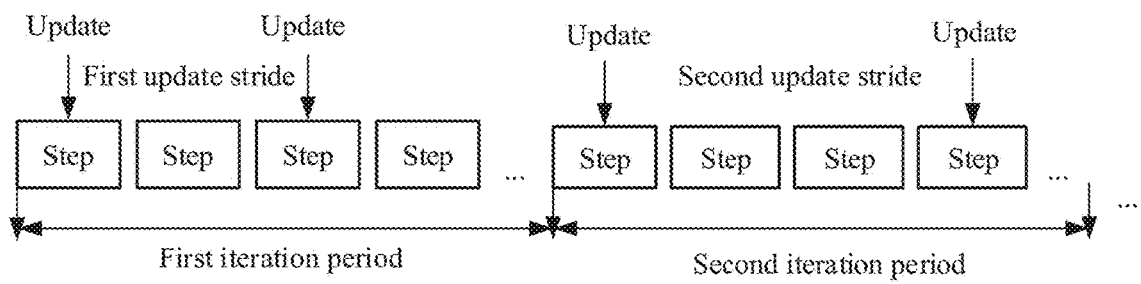
FIG. 7A is a schematic diagram of an example of a parameter updating method according to an embodiment of this application.
Figure 7B:
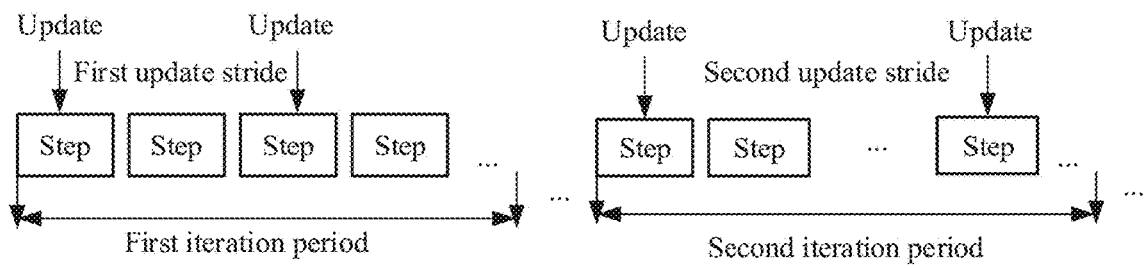
FIG. 7B is a schematic diagram of another example of a parameter updating method according to an embodiment of this application.

The first iteration period, the second iteration period, the first update stride, and the second update stride may be understood with reference to FIG. 7A and FIG. 7B.

FIG. 7A and FIG. 7B are two example schematic diagrams of the parameter updating method.

In FIG. 7A, the first iteration period and the second iteration period are two adjacent iteration periods in an execution sequence. In FIG. 7B, the first iteration period and the second iteration period are two non-adjacent iteration periods. Regardless of whether the first iteration period is adjacent to the second iteration period, provided that the second iteration period is after the first iteration period in the execution sequence.

In FIG. 7A, the first update stride is 2, to be specific, the inverse matrix of the additional matrix of the neural network model is updated once every 2 iterations; and a second update stride is 3, to be specific, the inverse matrix of the additional matrix of the neural network model is updated once every 3 iterations. In FIG. 7B, the first update stride is 2, and a value of the second update stride may be an integer equal to 3 or greater than 3. Actually, values of the first update stride and the second update stride in FIG. 7A and FIG. 7B are merely examples, provided that the second update stride is greater than the first update stride. A specific value is not limited in this embodiment of this application.

The foregoing describes the entire training process of the neural network model. For an $N^{th}$ iteration, the method may include: if the $N^{th}$ iteration in the plurality of iterations is in the third iteration period, and is an iteration in which an inverse matrix needs to be updated and that is indicated by a third update stride, updating the inverse matrix of the additional matrix of the neural network model, and updating the parameter in the neural network model by using an updated inverse matrix of the additional matrix and a first-order gradient of the $N^{th}$ iteration, where the third update stride is an update stride of the third iteration period, N is an integer, and N>1.

The third iteration period may be the first iteration period, may be the second iteration period, or may be any other iteration period. The $N^{th}$ iteration may be any iteration of the neural network model from the second iteration of training to the end of training. Actually, an inverse matrix may be updated in the first iteration, that is, when N=1. It is just that update in the first iteration does not need to be indicated by the third update stride, and an inverse matrix to be updated in the first iteration may be indicated by a preset update start location. In this possible implementation, for a step in which update needs to be performed, an inverse matrix is updated, and the parameter is updated by using an updated inverse matrix, so that the neural network model converges.

Optionally, for any iteration process of the plurality of iterations of the neural network model, for a parameter updating process provided in this embodiment of this application, reference may be made to the following embodiments for understanding.

Figure 8A:
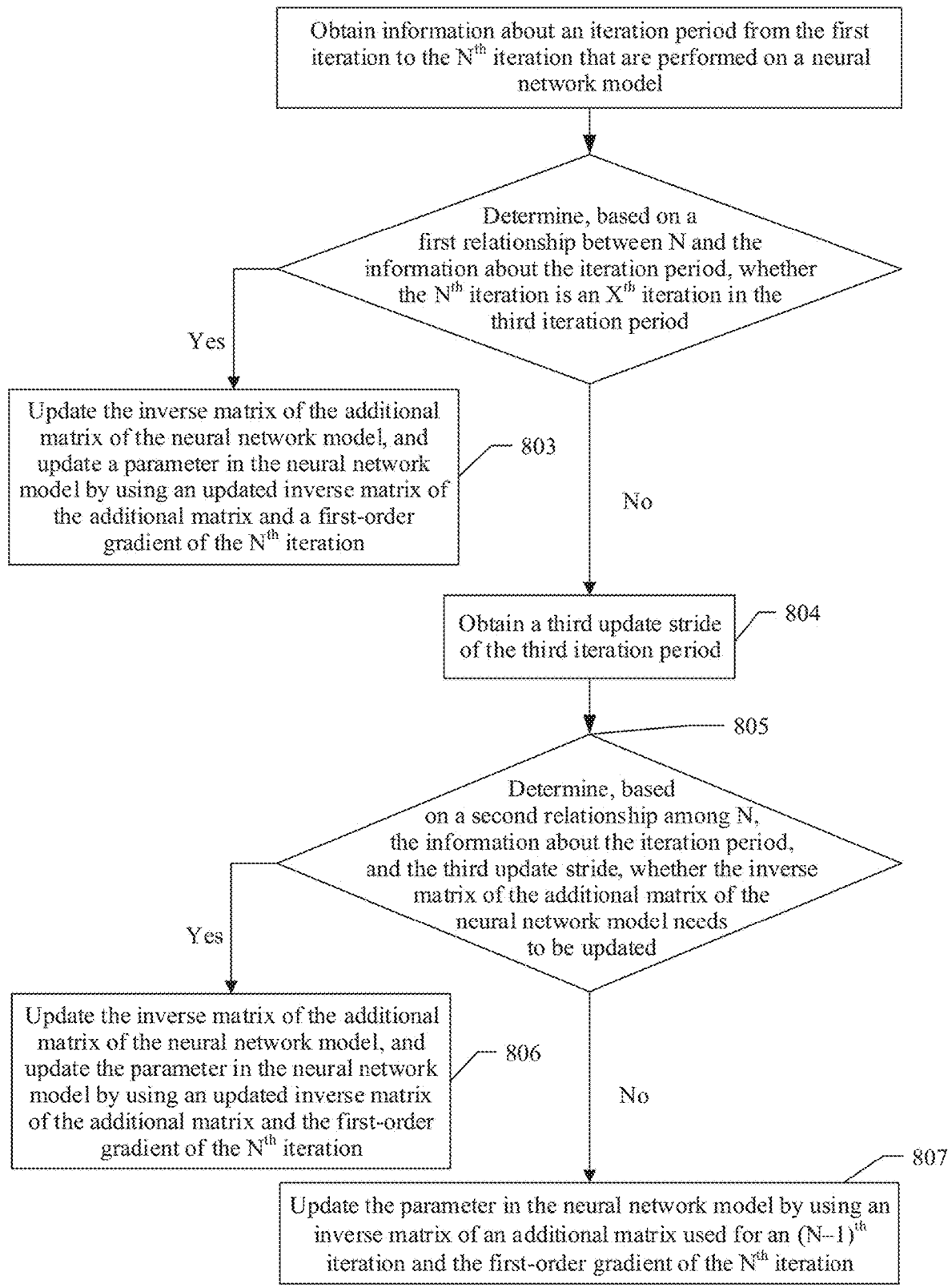
FIG. 8A is a schematic diagram of an embodiment of a parameter updating method according to an embodiment of this application.

FIG. 8A is a schematic diagram of an embodiment of a parameter updating method according to an embodiment of this application.

As shown in FIG. 8A, an embodiment of the parameter updating method provided in this embodiment of this application includes:

801: Obtain information about an iteration period from the first iteration to the $N^{th}$ iteration that are performed on a neural network model.

The information about the iteration period includes information about a third iteration period in which the $N^{th}$ iteration is located. If the third iteration period is not the first iteration period in an execution sequence, the information about the iteration period further includes information about a previous iteration period before the third iteration period in the execution sequence.

The iteration period refers to an iteration period from the first iteration to the $N^{th}$ iteration. In a training process of the neural network model, from the first iteration to the $N^{th}$ iteration, if the $N^{th}$ iteration is in a second iteration period, the iteration period includes a first iteration period and the second iteration period. If the $N^{th}$ iteration is in a first iteration period, the iteration period includes only the first iteration period. The information of the iteration period may include a value range of the iteration period, for example, a period 1 is from a step 1 to a step 200, and a period 2 is from a step 201 to a step 500.

Each iteration period corresponds to one update stride. As a quantity of iterations increases, the additional matrix of the neural network model and a corresponding inverse matrix become more stable, and no longer change or change less with the iterations. In this case, in an entire iteration process, an update stride corresponding to a later iteration period to be used may be set greater.

The update stride may be set as a square, a cosine curve, an exponential curve, a multiple increase, a piecewise constant, or the like of a sequence number of the iteration period.

For example, an implementation of determining the update stride by using the square of the sequence number of the iteration period is as follows:

$$F(x)=x^2, x=1,2,3,\ldots$$

$F(x)$ is an update stride of an $x^{th}$ iteration period.

Figure 8B:
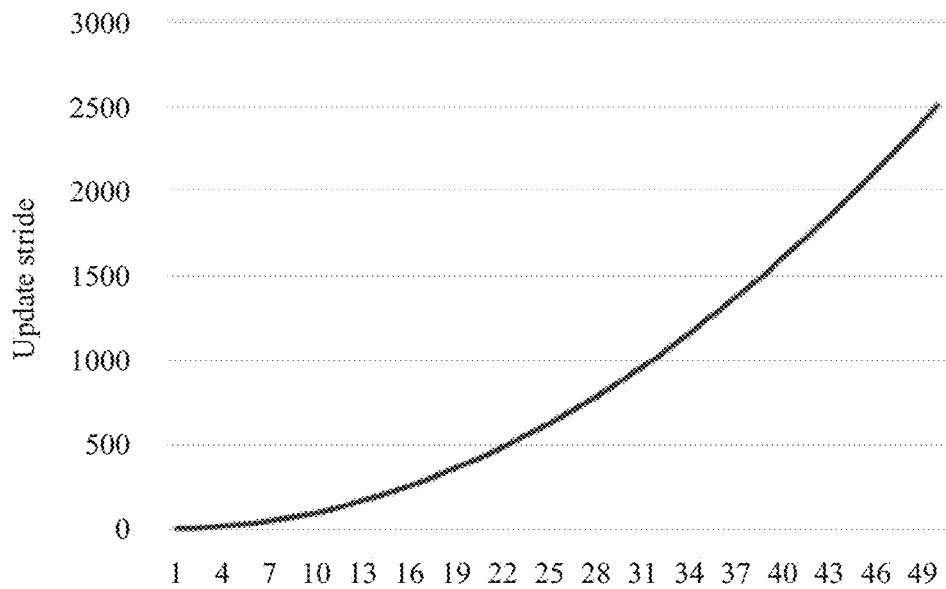
FIG. 8B is a schematic diagram of an example of a transformation curve of an update stride according to an embodiment of this application.

For a large-scale neural network, for example, there are 256 periods in a ResNet 50, and one period includes, for example, 5004 steps, in other words, period=5004. For a transformation curve of the update stride, refer to a part of an exponential curve shown in FIG. 8B.

The update stride may alternatively be increased in multiples. Further, a period 1 to a period 10 are used as an example. From the period 1 to the period 10, update strides corresponding to the 10 iteration periods gradually increase in multiples of, for example, 2. When an update stride of the first iteration period is equal to 1, that is, an update stride of the period 1 is set to 1, an update stride of the period 2 is 2 and an update stride of the period 3 is 4 in multiples of 2. In this case, correspondences from the period 1 to the period 10 may be understood with reference to Table 1 below.

TABLE 1

A table of a correspondence between an iteration period and an update stride

| Iteration period | Period (P) 1 | P2 | P3 | P4 | P5 | P6 | P7 | P8 | P9 | P10 |
|---|---|---|---|---|---|---|---|---|---|---|
| Update stride | 1 | 2 | 4 | 8 | 16 | 32 | 64 | 128 | 256 | 512 |

Certainly, a value of the update stride in Table 1 is merely used as an example for description. The value of the update stride may be set based on a requirement. For example, the update stride is set based on an increasing trend.

802: Determine, based on a first relationship between N and the information about the iteration period, whether the $N^{th}$ iteration is an $X^{th}$ iteration in the third iteration period; and if yes, perform step 803, or if no, perform step 804.

In this embodiment of this application, X is used to indicate an update start value in the third iteration period, and the update start value is used to indicate an iteration in which the inverse matrix is updated for the first time in the third iteration period. The $X^{th}$ iteration in the third iteration period is an iteration in which the inverse matrix is updated for the first time in the third iteration period.

If the $N^{th}$ iteration is in the first iteration period, when N=X, it indicates that the $N^{th}$ iteration is an iteration in which the inverse matrix is updated for the first time in the first iteration period.

If the information about the iteration period includes the information about the third iteration period and about the previous iteration period before the third iteration period in the execution sequence, the first relationship may be expressed as: (N−a total length of the previous iteration period)=a second difference.

If the second difference=X, it may be determined that the $N^{th}$ iteration is an iteration in which the inverse matrix is updated for the first time in the third iteration period.

A value of X is usually equal to 1, but is not limited to 1, usually provided that X is less than or equal to a minimum update stride. For example, if the minimum update stride is 3, X may be equal to 1, or may be equal to 2, or certainly may be equal to 3. Certainly, herein describes merely an example, the value of X may be set based on a requirement.

For example, it is assumed that the period 1 is from the step 1 to the step 200, the period 2 is from the step 201 to the step 500, N=201, and X=1. Based on N=201, it can be determined that, the third iteration period is the period 2 and the previous iteration period is the period 1. Based on the foregoing first relationship, the second difference=201−200=1=X can be obtained, and then it can be determined that the $N^{th}$ iteration is an iteration in which the inverse matrix is updated for the first time in the period 2.

It is assumed that the period 1 is from the step 1 to the step 200, the period 2 is from the step 201 to the step 500, the period 3 is from a step 501 to a step 1000, N=503, and X=1. Based on N=503, it can be determined that the third iteration period is the period 3 and the previous iteration period is the period 1 and the period 2. Based on the foregoing first relationship, the second difference=503−500=3≠1 can be obtained, that is, the $503^{rd}$ iteration is not an iteration in which the inverse matrix is updated for the first time in the period 3.

803: If the second difference indicates that the $N^{th}$ iteration is the $X^{th}$ iteration in the third iteration period, update the inverse matrix of the additional matrix of the neural network model by using an updated inverse matrix of the additional matrix and a first-order gradient of the $N^{th}$ iteration.

804: If the second difference indicates that the $N^{th}$ iteration is not the $X^{th}$ iteration in the third iteration period, obtain a third update stride of the third iteration period.

If N=503, an iteration period in which N is located is the period 3. With reference to Table 1, it can be learned that an update stride of the period 3 is equal to 4.

805: Determine, based on a second relationship among N, the information about the iteration period, and the third update stride, whether the inverse matrix of the additional matrix of the neural network model needs to be updated; and if yes, perform step 806, or if no, perform step 807.

Optionally, if the third iteration period is the first iteration period in all iteration periods, the second relationship may be represented as: (N−X) % the third update stride=a first remainder, where "%" represents taking a remainder.

X is the same as that in step 802, and indicates that the update start value. For a value and a physical meaning of X, refer to corresponding explanations in step 802 for understanding.

For example, the period 1 is from the step 1 to the step 200. If X=1, the update stride of the period 1 is equal to 1, and N=5, (5−1)%1=0, which indicates that the first remainder is equal to 0, and indicates that the inverse matrix needs to be updated in the fifth iteration. If X=1, the update stride is equal to 2, and N=6, (6−1)%2=1, which indicates that the first remainder is not equal to 0, and indicates that the inverse matrix does not need to be updated in the sixth iteration.

If there is the previous iteration period before the third iteration period, the second relationship may be expressed as: (N−X−a third difference) % the third update stride=the first remainder, where the third difference=(N−the total length of the previous iteration period).

For example, the period 1 is from the step 1 to the step 200, and the period 2 is from the step 201 to the step 500. If N=205, it indicates that the third iteration period is the period 2, and the period 1 is the previous iteration period. The total length of the previous iteration period is 200. If X=1, and the update stride of the period 2 is equal to 2, the first remainder=(205−1−200)%2=0, which indicates that the first remainder is equal to 0, and the inverse matrix needs to be updated in the 205$^{th}$ iteration.

If the period 1 is from the step 1 to the step 200, the period 2 is from the step 201 to the step 500, the period 3 is from the step 501 to the step 1000, and N=506, it indicates that the third iteration period is the period 3, and the period 1 and the period 2 are the previous iteration period. The total length of the previous iteration period is 500. If X=1, and the update stride of the period 3 is equal to 4, the first remainder=(506−1−500)/%4=1, which indicates that the first remainder is not equal to 0, and the inverse matrix does not need to be updated in the 506$^{th}$ iteration.

806: If the first remainder indicates that the inverse matrix of the additional matrix of the neural network model needs to be updated, update the inverse matrix of the additional matrix of the neural network model, and update the parameter in the neural network model by using an updated inverse matrix of the additional matrix and the first-order gradient of the N$^{th}$ iteration.

807: If the first remainder indicates that the inverse matrix of the additional matrix of the neural network model does not need to be updated, update the parameter in the neural network model by using an inverse matrix of an additional matrix used for an (N−1)$^{th}$ iteration and the first-order gradient of the N$^{th}$ iteration.

It can be learned from related descriptions of Solution 1 that, based on the step-based update, it is not necessary to update the inverse matrix of the additional matrix of the neural network model in each iteration. In this way, time overheads of updating the inverse matrix of the additional matrix can be reduced, thereby reducing training time of the neural network model, and improving a training speed of the neural network model.

Solution 2: Block-Based Update

Figure 9A:
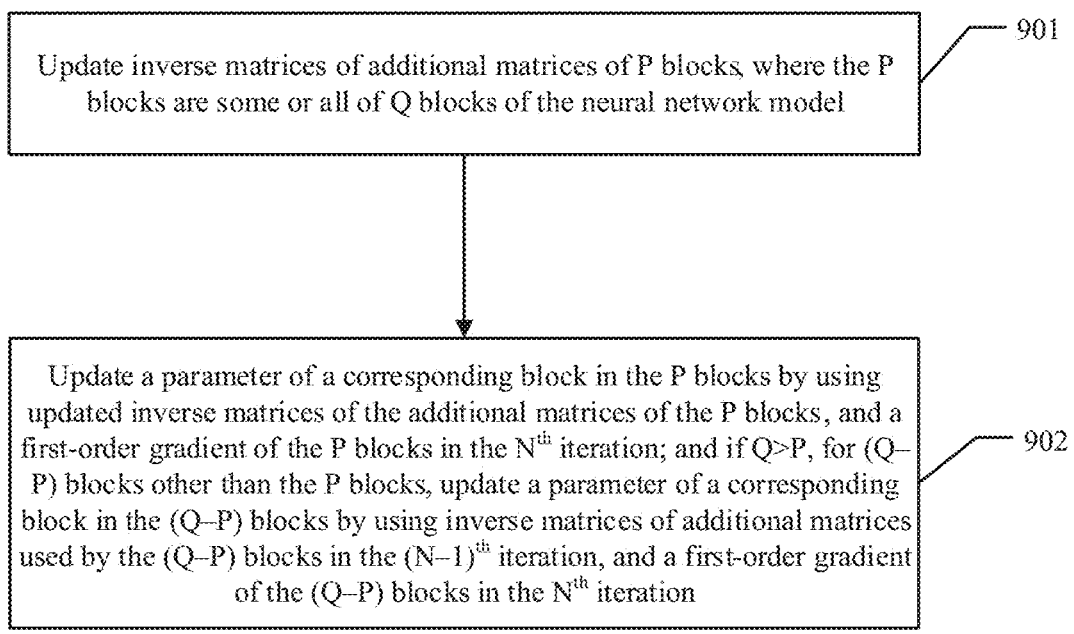
FIG. 9A is a schematic diagram of another embodiment of a parameter updating method according to an embodiment of this application.

FIG. 9A is a schematic diagram of another embodiment of a parameter updating method according to an embodiment of this application.

As shown in FIG. 9A, the another embodiment of the parameter updating method provided in this embodiment of this application includes:

901: Update inverse matrices of additional matrices of P blocks, where the P blocks are some or all of Q blocks of the neural network model.

When the inverse matrix is updated based on the blocks, all blocks or some of the blocks may be updated. Usually, at the beginning of model training, all the blocks are updated. As a quantity of iterations increases, a quantity of blocks in which inverse matrices need to be updated is reduced.

P and Q are integers, Q≥P, Q≥2, and P≥1.

For a concept of the block, reference may be made to the explanation of the block in FIG. 5A and FIG. 5B for understanding. Details are not described herein.

Each block has one additional matrix G, and based on G, a corresponding inverse matrix G$^1$ can be calculated. Before the inverse matrix of the additional matrix is not updated in the N$^{th}$ iteration, for an additional matrix G and an inverse matrix G$^1$ of each of the Q blocks of a block 1, a block 2, . . . , and a block Q in this deep neural network, refer to Table 2 for understanding.

TABLE 2

A table of a correspondence between an additional matrix G and an inverse matrix G$^{−1}$ of a block used in an N$^{th}$ iteration

| Block | Block 1 | Block 2 | . . . | Block Q |
|---|---|---|---|---|
| Additional matrix $G_{(N-1)}$ | $G_{1(N-1)}$ | $G_{2(N-1)}$ | . . . | $G_{Q(N-1)}$ |
| Inverse matrix $G_{(N-1)}^{-1}$ | $G_{1(N-1)}^{-1}$ | $G_{2(N-1)}^{-1}$ | . . . | $G_{Q(N-1)}^{-1}$ |

If Q=8, P=3, for example, if 3 blocks determined at the N$^{th}$ iteration are the block 1, a block 4, and a block 7, inverse matrices of the 3 blocks need to be updated, and an updated inverse matrix of the block 1 is $G_{1N}^{-1}$, an updated inverse matrix of the block 4 is $G_{4N}^{-1}$, and an updated inverse matrix of the block 7 is $G_{7N}^{-1}$. Inverse matrices of the other 5 blocks other than the three blocks remain unchanged, and are the same as inverse matrices used in the (N−1)$^{th}$ iteration. For a result of an additional matrix G and an inverse matrix G$^{−1}$ of each block updated in the N$^{th}$ iteration, refer to Table 3 for understanding.

TABLE 3

A table of a correspondence between an additional matrix G and an inverse matrix G$^{−1}$ of a block updated in the N$^{th}$ iteration

| Block | Block 1 | Block 2 | Block 3 | Block 4 | Block 5 | Block 6 | Block 7 | Block 8 |
|---|---|---|---|---|---|---|---|---|
| Additional matrix $G_N$ | $G_{1N}$ | $G_{2N}$ | $G_{3N}$ | $G_{4N}$ | $G_{5N}$ | $G_{6N}$ | $G_{7N}$ | $G_{8N}$ |
| Inverse matrix $G_N^{-1}$ | $G_{1N}^{-1}$ | $G_{2(N-1)}^{-1}$ | $G_{3(N-1)}^{-1}$ | $G_{4N}^{-1}$ | $G_{5(N-1)}^{-1}$ | $G_{6(N-1)}^{-1}$ | $G_{7N}^{-1}$ | $G_{8(N-1)}^{-1}$ |

It can be learned from Table 3 that, at the N$^{th}$ iteration, the additional matrix G of each block can be updated, but only the inverse matrices of the determined P blocks are updated. Actually, not all of the additional matrices G may be updated, but for the block in which the inverse matrix needs to be updated, the additional matrix needs to be updated.

902: Update a parameter of a corresponding block in the P blocks by using updated inverse matrices of the additional matrices of the P blocks, and a first-order gradient of the P blocks in the N$^{th}$ iteration; and if Q>P, for (Q−P) blocks other than the P blocks, update a parameter of a corresponding block in the (Q−P) blocks by using inverse matrices of additional matrices used by the (Q–P) blocks in the $(N-1)^{th}$ iteration, and a first-order gradient of the (Q–P) blocks in the $N^{th}$ iteration.

During updating of the parameter of the block, an update rule $\theta2=\theta1-\eta G^{-1}\nabla_\theta$ may be used for updating. To facilitate distinguishing a parameter in each step, the update rule may be rewritten as: $\theta_N=\theta_{(N-1)}-\eta G_N^{-1}\nabla_{\theta_N}$, where $\theta_N$ represents a parameter updated in the $N^{th}$ iteration, $O_{(N-1)}$ represents a parameter obtained in the $(N-1)^{th}$ iteration, $G_N^{-1}$ represents an inverse matrix in the $N^{th}$ iteration, and $\nabla_{\theta_N}$ represents a first-order gradient in the $N^{th}$ iteration.

The foregoing example of Q=8 and P=3 in step 901 is still used. Inverse matrices of the block 1, the block 4, and the block 7 are updated, and updated parameters of the block 1, the block 4, and the block 7 are respectively;

The updated parameter of the block 1 is: $\theta_{1N}=\theta_{1(N-1)}-\eta G_{1N}^{-1}\nabla_{\theta_{1N}}$.

The updated parameter of the block 4 is: $\theta_{4N}=\theta_{4(N-1)}-\eta G_{4N}^{-1}\nabla_{\theta_{4N}}$.

The updated parameter of the block 7 is: $\theta_{7N}=\theta_{7(N-1)}-\eta G_{7N}^{-1}\nabla_{\theta_{7N}}$.

$\theta_{1N}$, $\theta_{4N}$, and $\theta_{7N}$ are the updated parameters of the block 1, the block 4, and the block 7.

In addition to the block 1, the block 4, and the block 7, there are five remaining blocks in the 8 blocks; a block 2, a block 3, a block 5, a block 6, and a block 8. Inverse matrices of the five blocks are the same as inverse matrices used in the $(N-1)^{th}$ iteration, that is, the inverse matrices $G_N^{-1}$ of the five blocks in Table 3 are used to obtain $\theta_{2N}$, $\theta_{3N}$, $\theta_{5N}$, $\theta_{6N}$, and $\theta_{8N}$. A calculation process of these parameters may be represented as follows:

A parameter of the block 2 obtained in the $N^{th}$ iteration is: $\theta_{2N}=\theta_{2(N-1)}-\eta G_{2(N-1)}^{-1}\nabla_{\theta_{2N}}$.

A parameter of the block 3 obtained in the $N^{th}$ iteration is: $\theta_{3N}=\theta_{3(N-1)}-\eta G_{3(N-1)}^{-1}\nabla_{\theta_{3N}}$.

A parameter of the block 5 obtained in the $N^{th}$ iteration is: $\theta_{5N}=\theta_{5(N-1)}-\eta G_{5(N-1)}^{-1}\nabla_{\theta_{5N}}$.

A parameter of the block 6 obtained in the $N^{th}$ iteration is: $\theta_{6N}=\theta_{6(N-1)}-\eta G_{6(N-1)}^{-1}\nabla_{\theta_{6N}}$.

A parameter of the block 8 obtained in the $N^{th}$ iteration is: $\theta_{8N}=\theta_{8(N-1)}-\eta G_{8(N-1)}^{-1}\nabla_{\theta_{8N}}$.

It can be learned from the description in this embodiment that, based on the block-based update, an inverse matrix of an additional matrix of only at least one block is updated. In this way, time overheads of updating the inverse matrix of the additional matrix can be reduced, thereby reducing training time of the neural network model, and improving a training speed of the neural network model.

The P blocks in step 901 may be obtained in the following two manners.

Implementation 1: obtaining the P blocks from M blocks in the neural network model based on information about additional matrices of the M blocks, where the information about the additional matrix includes a trace of the additional matrix or a 2-norm of the additional matrix, the M blocks are blocks that are in the Q blocks in the $N^{th}$ iteration and whose additional matrices need to be updated, M is an integer, and Q≥M≥P.

Figure 9B:
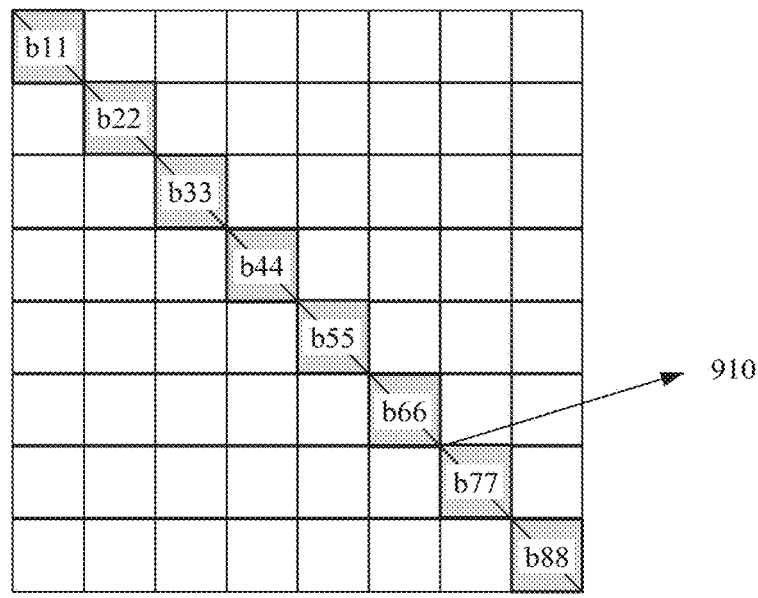
FIG. 9B is an example diagram of a trace indicating an additional matrix according to an embodiment of this application.

The trace of the additional matrix is a sum of values on a diagonal of the additional matrix. The additional matrix in this embodiment of this application is an equal-row and equal-column matrix, which may also be referred to as a positive-definite matrix. For a concept of the trace, refer to FIG. 9B for understanding. FIG. 9B shows an additional matrix of 8 rows×8 columns, and the additional matrix includes 64 values. A sum of 8 values on a diagonal line 910 of the matrix may be referred to as a trace of the additional matrix of 8 rows-8 columns, that is, the trace of the additional matrix of 8 rows×8 columns=b11+b22+b33+b44+b55+b66+b77+b88.

The 2-norm of the additional matrix is an extraction of square root of a maximum eigenvalue after a transposition of the additional matrix is multiplied by the additional matrix.

The obtaining the P blocks from M blocks in the neural network model based on information about additional matrices of the M blocks includes: obtaining the P blocks from the M blocks based on a trace of additional matrices of the M blocks in the $N^{th}$ iteration and a trace of additional matrices of the M blocks in the $(N-1)^{th}$ iteration.

It should be noted that, in this embodiment of this application, the trace of the additional matrices of the M blocks in the $(N-1)^{th}$ iteration is not limited to a trace of additional matrices updated in the $(N-1)^{th}$ iteration. If the additional matrices are not updated in the $(N-1)^{th}$ iteration, the trace of the additional matrices of the M blocks in the $(N-1)^{th}$ iteration may be a trace of additional matrices updated in a latest iteration from the $N^{th}$ iteration. The updated trace is stored in a memory or a cache, and can be used by obtaining from the memory or the cache.

The additional matrices of the M blocks in the Q blocks further need to be updated. (Q–M) blocks other than the M blocks are blocks that basically do not change in the $N^{th}$ iteration. For these blocks, not only inverse matrices do not need to be updated, but also additional matrices do not need to be updated. In this case, when the P blocks whose inverse matrices need to be updated are selected, the (Q–M) blocks whose additional matrices basically do not change can be directly excluded, and selection is directly performed on the M blocks whose additional matrices further need to be updated. This can further reduce training time of the neural network model.

The obtaining the P blocks from the M blocks based on a trace of additional matrices of the M blocks in the $N^{th}$ iteration and a trace of additional matrices of the M blocks in the $(N-1)^{th}$ iteration includes: obtaining the P blocks whose first ratio is greater than a first threshold from the M blocks, where the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

This process may be determined based on the following relation formula:

$$\frac{tr(F^N)-tr(F^{(N-1)})}{tr(F^{(N-1)})} > T1$$

where $F^N$ represents the additional matrix in the $N^{th}$ iteration, $F^{(N-1)}$ represents the additional matrix in the $(N-1)^{th}$ iteration, $tr(F^N)$ represents the trace of the matrix $F^N$, $tr(F^{(N-1)})$ represents the trace of the matrix $F^{(N-1)}$, $tr(F^N)-tr(F^{(N-1)})$ represents the first difference, $$\frac{tr(F^N)-tr(F^{(N-1)})}{tr(F^{(N-1)})}$$

represents the first ratio, and T1 represents the first threshold.

If a first ratio of a block is greater than T1, it can be determined that an inverse matrix of the block needs to be updated. If the first ratio of an additional matrix of a block is less than T1, it indicates that an inverse matrix of the block does not need to be updated.

In this implementation, there may be another relation formula:

$$\frac{tr(F^N) - tr(F^{(N-1)})}{tr(F^{(N-1)})} < T2,$$

where T2 is a second threshold, and T2<T1. If the ratio of a block is less than T2, it indicates that in a next iteration, an additional matrix of the block does not need to be updated either.

A value of T1 may be set to 0.01, and a value of T2 may be set to 0.001. If the first ratio of an additional matrix of a block is greater than 0.01, it indicates that an inverse matrix of the block needs to be updated. If the first ratio of the additional matrix of the block is less than 0.01, it indicates that the inverse matrix of the block does not need to be updated. If the first ratio of the additional matrix of the block is less than 0.001, it indicates that the additional matrix of the block does not need to be updated in a subsequent iteration process. Certainly, values of T1 and T2 may be set based on a requirement, and 0.01 and 0.001 herein are merely used as examples for description.

Implementation 1 may also be referred to as a calculation process based on an online model. The online model is applicable to a user unfamiliar with a structure of the neural network model. In Implementation 1, whether a block needs to be updated may be determined based on a trace in an iteration process, which can improve selection accuracy of the block.

Implementation 2 may be referred to as a calculation process based on an offline model relative to the online model. When using the offline model, a user can manually adjust a sampling probability of each block, which is suitable for a user familiar with the structure of the neural network model. When the offline model is used, the sampling probability of each block can be set by using prior information.

Implementation 2: obtaining the P blocks from a plurality of blocks in the neural network model based on sampling probabilities of the plurality of blocks, where a sampling probability of a block is used to indicate a probability that an inverse matrix of an additional matrix of the block is updated in the $N^{th}$ iteration.

The sampling probability of one of the plurality of blocks is related to a quantity of parameters in the block and a total quantity of parameters in the neural network model. Alternatively, the sampling probabilities of the plurality of blocks are preconfigured.

Each block has a different influence on a training process. In this case, a sampling probability of each block is also different. A block with a larger quantity of parameters has a greater influence on the training process. The sampling probability of each block may be determined based on $$\frac{w_i}{\sum_j w_j},$$

where $w_i$ represents a quantity of parameters of an $i^{th}$ block, and $\sum_j w_j$ represents the total quantity of parameters in the neural network model. The sampling probability is determined based on the quantity of parameters in the block, which is more beneficial to increase a selection probability of a block with a large influence on the neural network model.

After the sampling probability is calculated, sampling may be performed based on the sampling probability. Then, an index value of a block whose an inverse matrix of an additional matrix needs to be updated is output. If there are 10 blocks in the neural network model, if output index values are 1, 4, and 7, it represents that inverse matrices of additional matrices of the blocks 1, 4, and 10 need to be updated.

Figure 9C:
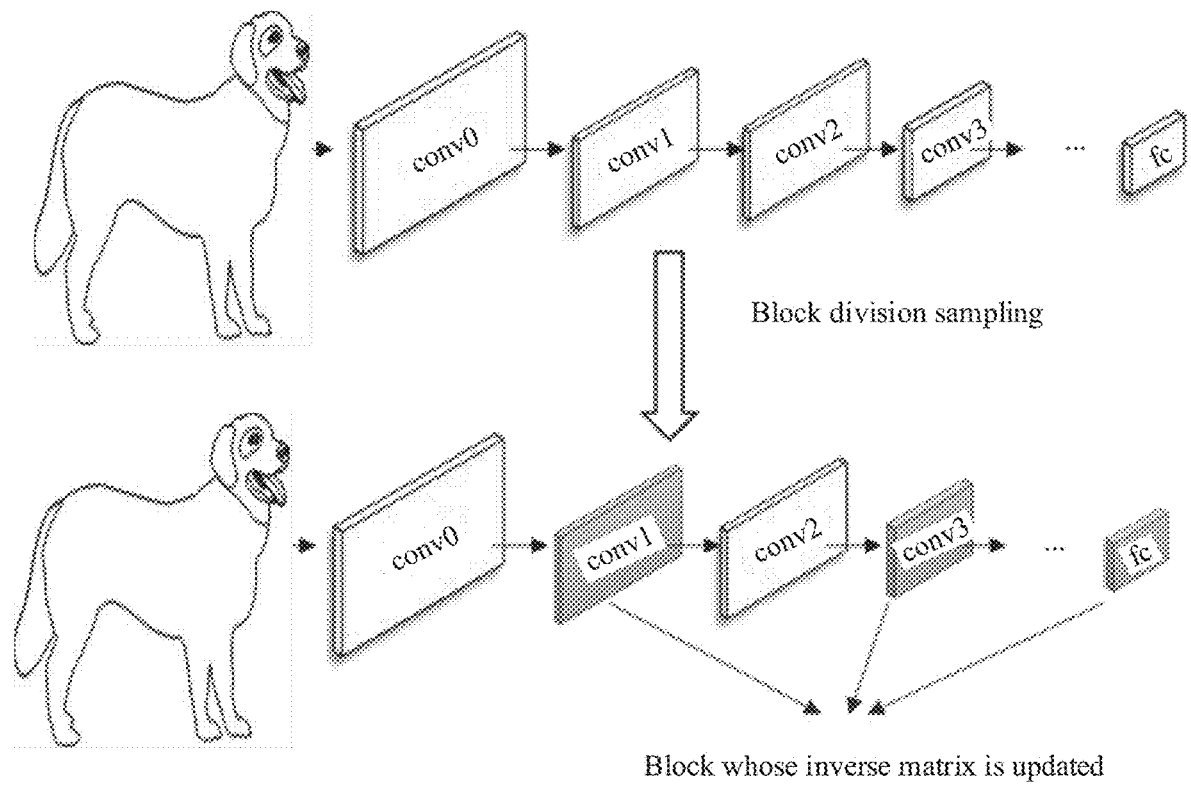
FIG. 9C is a schematic diagram of an example of block sampling according to an embodiment of this application.

This process may be further understood with reference to FIG. 9C. As shown in FIG. 9C, the neural network model is trained by using pictures. The neural network model includes a plurality of blocks, such as convolutional (conv) layers a conv 0, a conv 1, a conv 2, a conv 3, . . . , and a full connected (fc) layer. Block division sampling is performed based on the foregoing sampling probability, to determine that inverse matrices of additional matrices of three blocks the conv 1, conv 3, and fc layers need to be updated in this iteration.

It can be learned from Solution 2 that, in the block-based update, update is performed in some blocks, which can reduce dimensions of inverse matrices of additional matrices, thereby reducing training time of the neural network model, and improving a training speed of the neural network model.

Solution 3: Step-Based Update+Block-Based Update

Solution 3 is equivalent to a combination of Solution 1 and Solution 2. After determining that the inverse matrix needs to be updated in the $N^{th}$ iteration, the block-based update is performed in the $N^{th}$ iteration. If the inverse matrix does not need to be updated in the $N^{th}$ iteration, the block-based update is not performed.

Figure 10:
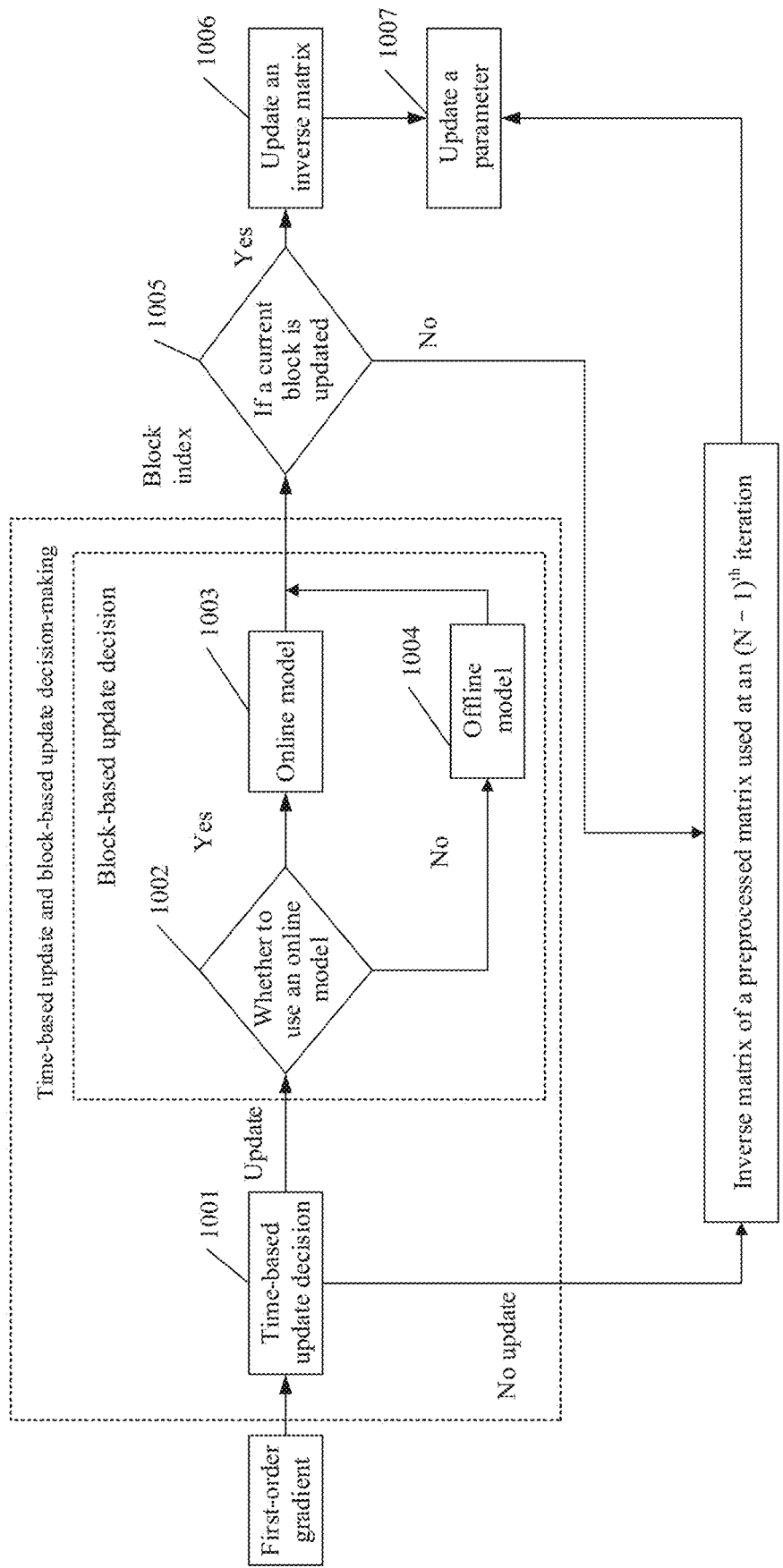
FIG. 10 is a schematic diagram of another embodiment of a parameter updating method according to an embodiment of this application.

For this process, refer to FIG. 10 for understanding. FIG. 10 is a schematic diagram of another embodiment of a parameter updating method according to an embodiment of this application.

As shown in FIG. 10, the another embodiment of the parameter updating method provided in this embodiment of this application includes:

1001. Make a step-based update decision after a first-order gradient is calculated in an $N^{th}$ iteration.

For a decision making process of step-based update, reference may be made to corresponding content in Solution 1 for understanding. Details are not described herein.

If the decision is updated in step 1001, step 1002 is performed. If the decision is not updated in step 1001, an inverse matrix of an additional matrix used in an $(N-1)^{th}$ iteration and the first-order gradient in the $N^{th}$ iteration are used to update a parameter in a neural network model to perform step 1007, that is, perform parameter updating.

1002: Determine whether to perform block sampling by using an online model. If yes, step 1003 is performed. If no, step 1004 is performed.

1003: Perform block sampling by using the online model.

1003 may be understood with reference to content of Implementation 1 in Solution 2.

1004: Perform block sampling by using an offline model.

1003 may be understood with reference to content of Implementation 2 in Solution 2.

1005: Determine, based on a block index, whether a current block is updated; and if yes, perform step 1006, or if no, perform step 1007 by using an additional matrix of the block used in the (N−1)$^{th}$ iteration and an inverse matrix of a first-order gradient of the block in the N$^{th}$ iteration, that is, perform parameter updating.

1006: Update an inverse matrix of the additional matrix of the block.

After step 1006 is performed, step 1007 is performed by using an updated inverse matrix of the additional matrix and the first-order gradient of the block in the N$^{th}$ iteration, that is, parameter updating is performed.

1007: Update the parameter.

If the inverse matrix of the block is updated, the parameter in the neural network model is updated by using the updated inverse matrix and the first-order gradient in the N$^{th}$ iteration.

If the inverse matrix of the block is not updated, the inverse matrix of the additional matrix used at the (N−1)$^{th}$ iteration and the first-order gradient in the N$^{th}$ iteration are used to update the parameter in the neural network model.

In Solution 3, the block-based update is performed based on the step-based update, which can further reduce training time of the neural network model and improve a training speed of the neural network model.

To describe effect of the solution in this application, the following uses a same hardware environment and a same software environment, and tests are performed by using three different algorithms, and test data in Table 4 is obtained.

A to-be-tested sample data set is an ImageNet full set, the neural network model is a large-scale neural network model ResNet 50, a processor adopts a GPU V100, and a deep learning framework of the software environment is PyTorch.

In the solution in this application, an optimizer is based on a natural gradient method. First, a matrix of the neural network model is divided into blocks based on a network structure. Then, solutions of the step-based update and the block-based update described in the foregoing embodiments are used for testing, to obtain data in columns in which the step-based update and the block-based update are located in Table 4 below.

In addition, a stochastic gradient descent (stochastic gradient descent, SGD) algorithm and a momentum algorithm are used for testing, to obtain data in a column in which the SGD+Momentum algorithms are located in Table 4.

In addition, an original (original) kronecker-factored approximate curvature (kronecker-factored approximate curvature, KFAC) algorithm is used for testing, to obtain data in a column in which the original KFAC algorithm is located in Table 4.

TABLE 4

Comparison table of experimental data

| | Hardware environment: V100/16G × 8 Software environment: PyTorch | | |
|---|---|---|---|
| Index/Algorithm | SGD + Momentum | Original KFAC | Step-based update and block-based update |
| Average time of a single iteration (millisecond, ms for short) | 122.80 | 4087.29 | 199.96 |
| Convergence iteration quantity (75% top-1) | 395316 | 170136 | 170136 |
| Total calculation time of additional matrices/inverse matrices (hour: hours) | 0.00 | 187.36 | 3.75 |
| Total training time (hours) | 13.48 | 214 | 9.55 |

It can be learned from Table 4 that, compared with a second-order optimizer of the original KFAC algorithm, the solution of the step-based update and the block-based update in this application decreases by 20 times in the total training time, and decreases by 50 times in the total calculation time of additional matrices/inverse matrices. Further, a single iteration is far faster than that in the original KFAC algorithm. The convergence iteration quantity (75% top−1) in this application decreases more than 1 time than that of a first-order optimizer of the SGD+Momentum, and a convergence speed is far faster than that of the first-order optimizer. The training time in this application also decreases by about 30% than that of the first-order optimizer, and is far faster than that of the first-order optimizer.

The foregoing describes the parameter updating method in this embodiment of this application, and the following describes a corresponding apparatus with reference to the accompanying drawings.

Figure 11:
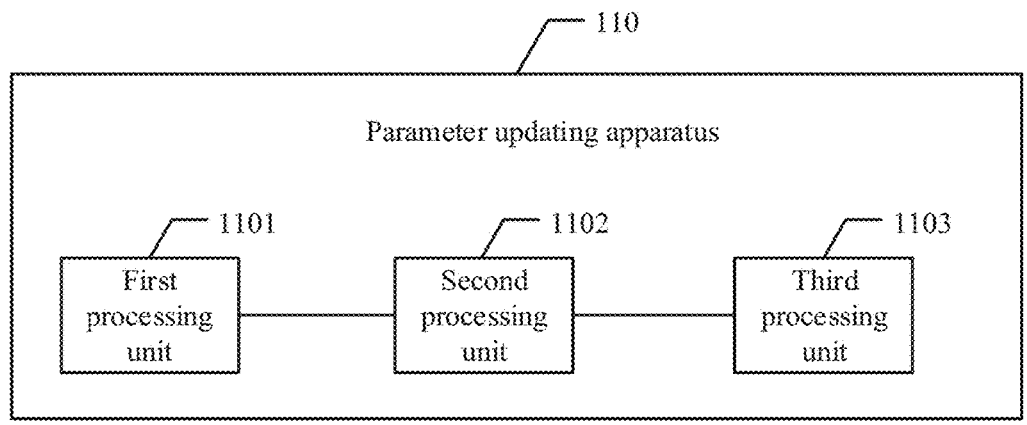
FIG. 11 is a schematic diagram of an embodiment of a parameter updating apparatus according to an embodiment of this application.

FIG. 11 is a schematic diagram of an embodiment of a parameter updating apparatus according to an embodiment of this application.

As shown in FIG. 11, this embodiment of this application is an embodiment of a parameter updating apparatus 110. The parameter updating apparatus is configured to update a parameter in a neural network model for a plurality of times through a plurality of iterations. The plurality of iterations include a first iteration period and a second iteration period. The apparatus 110 includes:

a first processing unit 1101, configured to update, in the first iteration period, an inverse matrix of an additional matrix of the neural network model once based on a quantity of iterations indicated by each first update stride, where the first iteration period includes at least two iterations; and a second processing unit 1102, configured to update, in the second iteration period, the inverse matrix of the additional matrix of the neural network model once based on a quantity of iterations indicated by each second update stride, where the second iteration period includes at least two iterations, the first iteration of the second iteration period is after the last iteration of the first iteration period in an iteration sequence, and the second update stride is greater than the first update stride.

According to the solution provided in this embodiment of this application, based on step-based update, it is not necessary to update the inverse matrix of the additional matrix of the neural network model in each iteration. In this way, time overheads of updating the inverse matrix of the additional matrix can be reduced, thereby improving a training speed of the neural network model.

Optionally, the plurality of iterations include a third iteration period, and the third iteration period is any iteration period of the plurality of iterations. The apparatus 110 further includes: a third processing unit 1103, configured to: if an $N^{th}$ iteration in the plurality of iterations is in the third iteration period, and is an iteration in which an inverse matrix needs to be updated and that is indicated by a third update stride, update the inverse matrix of the additional matrix of the neural network model, and update the parameter in the neural network model by using an updated inverse matrix of the additional matrix and a first-order gradient of the $N^{th}$ iteration, where the third update stride is an update stride of the third iteration period, N is an integer, and N≥1.

Optionally, the third processing unit 1103 is configured to: update inverse matrices of additional matrices of P blocks, where the P blocks are some or all of Q blocks of the neural network model, P and Q are integers, Q≥P, Q≥2, and P≥1; update a parameter of a corresponding block in the P blocks by using updated inverse matrices of the additional matrices of the P blocks, and a first-order gradient of the P blocks in the $N^{th}$ iteration; and if N≥1 and Q≥P, for (Q−P) blocks other than the P blocks, update a parameter of a corresponding block in the (Q−P) blocks by using inverse matrices of additional matrices used by the (Q−P) blocks in the $(N-1)^{th}$ iteration, and a first-order gradient of the (Q−P) blocks in the $N^{th}$ iteration.

Optionally, the third processing unit 1103 is further configured to obtain the P blocks from M blocks in the neural network model based on information about additional matrices of the M blocks, where the information about the additional matrix includes a trace of the additional matrix or a 2-norm of the additional matrix, the M blocks are blocks that are in the Q blocks in the $N^{th}$ iteration and whose additional matrices need to be updated, M is an integer, and Q≥M≥P.

Optionally, the third processing unit 1103 is configured to obtain the P blocks from the M blocks based on a trace of additional matrices of the M blocks in the $N^{th}$ iteration and a trace of additional matrices of the M blocks in the $(N-1)^{th}$ iteration.

Optionally, the third processing unit 1103 is configured to obtain the P blocks whose first ratio is greater than a first threshold from the M blocks, where the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

Optionally, the third processing unit 1103 is further configured to obtain the P blocks from a plurality of blocks in the neural network model based on sampling probabilities of the plurality of blocks, where a sampling probability of a block is used to indicate a probability that an inverse matrix of an additional matrix of the block is updated in the $N^{th}$ iteration.

Optionally, the third processing unit 1103 is further configured to update the inverse matrix when a second difference in the $N^{th}$ iteration is equal to an update start value, where the second difference is a difference between N and a total length of a previous iteration period, the previous iteration period is located before the third iteration period in an execution sequence, and the update start value is used to indicate an iteration in which the inverse matrix is updated for the first time in the third iteration period.

Optionally, the third processing unit 1103 is configured to update the inverse matrix when a first remainder in the $N^{th}$ iteration is 0, where the first remainder is a remainder between a third difference and the third update stride, the third difference is a difference between an (N−an update start value) and a total length of a previous iteration period, the previous iteration period is located before the third iteration period in the execution sequence, and the update start value is used to indicate an iteration in which the inverse matrix is updated for the first time in the third iteration period.

The foregoing describes the solution of the step-based update and the solution of the block-based update and the step-based update of the parameter updating apparatus. For content of this part, refer to corresponding content in the foregoing embodiments. Details are not described herein.

In addition, the parameter updating apparatus 110 provided in this embodiment of this application can further separately perform a process of the block-based update. In this case, the parameter updating apparatus 110 is configured to update a parameter in a neural network model for a plurality of times through a plurality of iterations. For an $N^{th}$ iteration in the plurality of iterations, N is an integer greater than 1. The apparatus 110 includes:

a first processing unit 1101, configured to update inverse matrices of additional matrices of P blocks, where the P blocks are some or all of Q blocks of the neural network model, P and Q are integers, Q≥P, Q≥2, and P≥1; and a second processing unit 1102, configured to update a parameter of a corresponding block in the P blocks by using updated inverse matrices of the additional matrices of the P blocks, and a first-order gradient of the P blocks in the $N^{th}$ iteration; and if Q>P, for (Q−P) blocks other than the P blocks, update a parameter of a corresponding block in the (Q−P) blocks by using inverse matrices of additional matrices used by the (Q−P) blocks in an $(N-1)^{th}$ iteration, and a first-order gradient of the (Q−P) blocks in the $N^{th}$ iteration.

Based on the block-based update used in this embodiment of this application, the inverse matrices of the additional matrices of all the blocks or some of the blocks can be updated based on a requirement. In this way, time overheads of updating the inverse matrix can be reduced, thereby reducing training time of the neural network model, and improving a training speed of the neural network model.

Optionally, a third processing unit 1103 is configured to obtain the P blocks from M blocks in the neural network model based on information about additional matrices of the M blocks, where the information about the additional matrix includes a trace of the additional matrix or a 2-norm of the additional matrix, the M blocks are blocks that are in the Q blocks in the $N^{th}$ iteration and whose additional matrices need to be updated, M is an integer, and Q≥M≥P.

Optionally, the third processing unit 1103 is configured to obtain the P blocks from the M blocks based on a trace of additional matrices of the M blocks in the $N^{th}$ iteration and a trace of additional matrices of the M blocks in the $(N-1)^{th}$ iteration.

Optionally, the third processing unit 1103 is configured to obtain the P blocks whose first ratio is greater than a first threshold from the M blocks, where the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

Optionally, the third processing unit 1103 is further configured to obtain the P blocks from a plurality of blocks in the neural network model based on sampling probabilities of the plurality of blocks, where a sampling probability of a block is used to indicate a probability that an inverse matrix of an additional matrix of the block is updated in the $N^{th}$ iteration.

The foregoing describes the solution of the block-based update of the parameter updating apparatus. For content of this part, refer to corresponding content in the foregoing embodiments. Details are not described herein.

It should be noted that, for the first processing unit 1101, the second processing unit 1102, and the third processing unit 1103, functions of the three processing units may be implemented by using one processing unit, or functions of the three processing units may be implemented by using two or three processing units.

The parameter updating apparatus 110 may be understood with reference to the foregoing embodiments of the parameter updating method. Details are not described herein.

Figure 12:
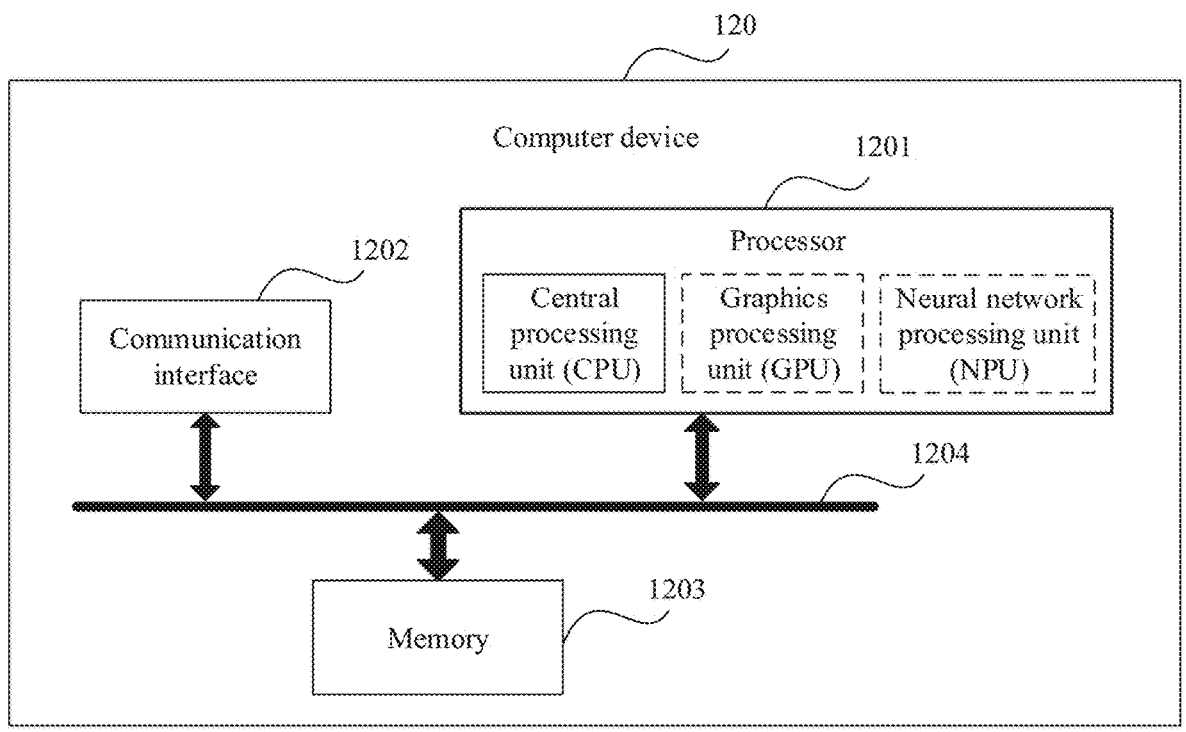
FIG. 12 is a schematic diagram of a structure of a computer device according to an embodiment of this application.

FIG. 12 is a schematic diagram of a possible logical structure of a computer device 120 according to an embodiment of this application. The computer device 120 includes a processor 1201, a communication interface 1202, a memory 1203, and a bus 1204. The processor 1201 may include a CPU, or at least one of a CPU, a GPU, an NPU, and another type of processor. The processor 1201, the communication interface 1202, and the memory 1203 are connected to each other through the bus 1204. In this embodiment of this application, the processor 1201 is configured to control and manage an action of the computer device 120. For example, the processor 1201 is configured to: update, in a first iteration period, an inverse matrix of an additional matrix of a neural network model once based on a quantity of iterations indicated by each first update stride; and update, in a second iteration period, the inverse matrix of the additional matrix of the neural network model once based on a quantity of iterations indicated by each second update stride.

Alternatively, the processor 1201 is configured to perform steps 801 to 803 in FIG. 8A, steps 901 and 902 in FIG. 9A, and steps 1001 to 1007 in FIG. 10 and/or other processes in the technology described in this specification. The communication interface 1202 is configured to support the computer device 120 for communication. The memory 1203 is configured to store program code and data of the computer device 120.

The processor 1201 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1204 may be a peripheral component interconnect (Peripheral Component Interconnect, PCI) bus, an extended industry standard architecture (Extended Industry Standard Architecture, EISA) bus, and or the like. The bus may be classified into an address bus, a data bus, a control bus, and the like. For ease of representation, only one thick line is for representing the bus in FIG. 12, but this does not mean that there is only one bus or only one type of bus.

Figure 13:
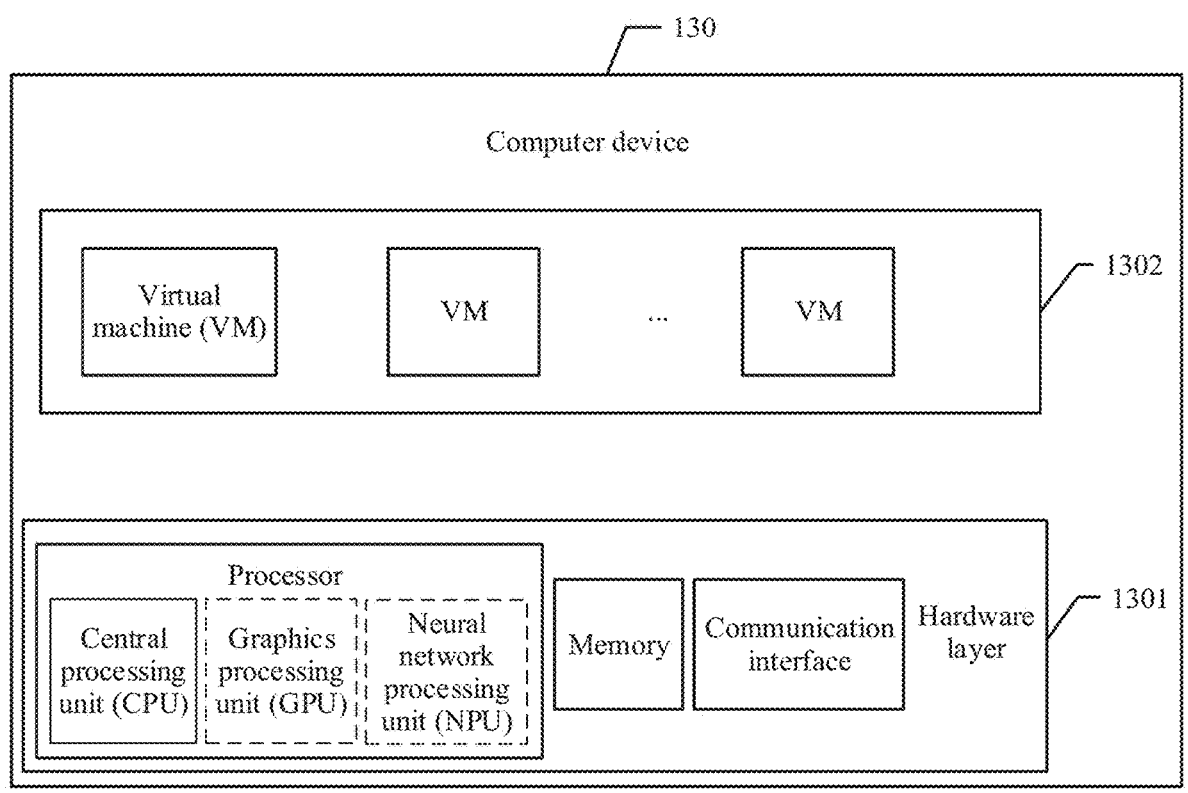
FIG. 13 is a schematic diagram of another structure of a computer device according to an embodiment of this application.

FIG. 13 is a schematic diagram of a possible logical structure of a computer device 130 according to an embodiment of this application. The computer device 130 includes a hardware layer 1301 and a virtual machine (virtual machine, VM) layer 1302, and the VM layer may include one or more VMs. The hardware layer 1301 provides a hardware resource for the VM to support running of the VM. For a function of the VM and a process related to this application, refer to the foregoing corresponding descriptions in FIG. 6 to FIG. 10 for understanding. The hardware layer 1301 includes hardware resources such as a processor, a communication interface, and a memory. The processor may include a CPU, or at least one of a CPU, a GPU, and an NPU.

In another embodiment of this application, a computer-readable storage medium is further provided, and the computer-readable storage medium stores computer-executable instructions. When at least one processor of a device executes the computer-executable instructions, the device performs the parameter updating method described in the foregoing embodiments of FIG. 6 to FIG. 10.

In another embodiment of this application, a computer program product is further provided, and the computer program product includes computer-executable instructions. The computer-executable instructions are stored in a computer-readable storage medium. At least one processor of a device can read the computer-executable instructions from the computer-readable storage medium. The at least one processor executes the computer-executable instructions, and the device is enabled to perform the parameter updating method described in the foregoing embodiments of FIG. 6 to FIG. 10.

In another embodiment of this application, a system on chip is further provided, and the system on chip includes a processor, configured to support a parameter update apparatus to implement the parameter updating method described in the foregoing embodiments of FIG. 6 to FIG. 10. In a possible design, the system on chip may further include a memory, and the memory is configured to store program instructions and data that are necessary for the parameter updating apparatus. The chip system may include a chip, or may include a chip and another discrete component.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in embodiments of this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A parameter updating method, wherein the parameter updating method updates a parameter in a neural network model for a plurality of times through a plurality of iterations, the plurality of iterations comprise a first iteration period and a second iteration period, and the method comprises:

updating, in the first iteration period, an inverse matrix of an additional matrix of the neural network model once based on a quantity of iterations indicated by a first update stride, wherein the first iteration period comprises at least two iterations; and updating, in the second iteration period, the inverse matrix of the additional matrix of the neural network model once based on a quantity of iterations indicated by a second update stride, wherein the second iteration period comprises at least two iterations, a first iteration of the second iteration period is after a last iteration of the first iteration period in an iteration sequence, and the second update stride is greater than the first update stride.

2. The method according to claim 1, wherein the plurality of iterations comprise a third iteration period, the third iteration period is any iteration period of the plurality of iterations, and the method further comprises:

when an $N^{th}$ iteration in the plurality of iterations is in the third iteration period, and is an iteration in which an inverse matrix needs to be updated and that is indicated by a third update stride, updating the inverse matrix of the additional matrix of the neural network model, and updating the parameter in the neural network model by using an updated inverse matrix of the additional matrix and a first-order gradient of the $N^{th}$ iteration, wherein the third update stride is an update stride of the third iteration period, N is an integer, and N>1.

3. The method according to claim 2, wherein the updating the inverse matrix of the additional matrix of the neural network model, and updating the parameter in the neural network model by using an updated inverse matrix of the additional matrix and a first-order gradient of the $N^{th}$ iteration comprises:

updating inverse matrices of additional matrices of P blocks, wherein the P blocks are some or all of Q blocks of the neural network model, P and Q are integers, Q≥P, Q≥2, and P≥1;

updating a parameter of a corresponding block in the P blocks by using updated inverse matrices of the additional matrices of the P blocks and a first-order gradient of the P blocks in the $N^{th}$ iteration; and when Q>P, for (Q–P) blocks other than the P blocks, updating a parameter of a corresponding block in the (Q–P) blocks by using inverse matrices of additional matrices used by the (Q–P) blocks in an $(N-1)^{th}$ iteration and a first-order gradient of the (Q–P) blocks in the $N^{th}$ iteration.

4. The method according to claim 3, wherein the method further comprises:

obtaining the P blocks from M blocks in the neural network model based on information about additional matrices of the M blocks, wherein the information about the additional matrix comprises a trace of the additional matrix or a 2-norm of the additional matrix, the M blocks are blocks that are in the Q blocks in the $N^{th}$ iteration and whose additional matrices need to be updated, M is an integer, and Q≥M≥P.

5. The method according to claim 4, wherein the obtaining the P blocks from M blocks in the neural network model based on information about additional matrices of the M blocks comprises:

obtaining the P blocks from the M blocks based on a trace of additional matrices of the M blocks in the $N^{th}$ iteration and a trace of additional matrices of the M blocks in the $(N-1)^{th}$ iteration.

6. The method according to claim 5, wherein the obtaining the P blocks from the M blocks based on a trace of additional matrices of the M blocks in the $N^{th}$ iteration and a trace of additional matrices of the M blocks in the $(N-1)^{th}$ iteration comprises:

obtaining the P blocks whose first ratio is greater than a first threshold from the M blocks, wherein the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

7. The method according to claim 3, wherein the method further comprises:

obtaining the P blocks from a plurality of blocks in the neural network model based on sampling probabilities of the plurality of blocks, wherein a sampling probability of a block indicates a probability that an inverse matrix of an additional matrix of the block is updated in the $N^{th}$ iteration.

8. The method according to claim 2, wherein the method further comprises:

updating the inverse matrix when a second difference in the $N^{th}$ iteration is equal to an update start value, wherein the second difference is a difference between N and a total length of a previous iteration period, the previous iteration period is located before the third iteration period in the iteration sequence, and the update start value indicates an iteration in which the inverse matrix is updated for the first time in the third iteration period.

9. The method according to claim 2, wherein the method further comprises:
updating the inverse matrix when a first remainder in the $N^{th}$ iteration is 0, wherein the first remainder is a remainder between a third difference and the third update stride, the third difference is a difference between an (N−an update start value) and a total length of a previous iteration period, the previous iteration period is located before the third iteration period in the iteration sequence, and the update start value indicates an iteration in which the inverse matrix is updated for the first time in the third iteration period.

10. The method according to claim 1, wherein in the first iteration period, the inverse matrix of the additional matrix of the neural network model is updated once every quantity of iterations indicated by the first update stride.

11. A parameter updating method, wherein the parameter updating method updates a parameter in a neural network model for a plurality of times through a plurality of iterations, for an $N^{th}$ iteration in the plurality of iterations, N is an integer greater than 1, and the method comprises:
updating inverse matrices of additional matrices of P blocks, wherein the P blocks are some or all of Q blocks of the neural network model, P and Q are integers, Q≥P, Q≥2, and P≥1;
updating a parameter of a corresponding block in the P blocks by using updated inverse matrices of the additional matrices of the P blocks and a first-order gradient of the P blocks in the $N^{th}$ iteration; and
when Q>P, for (Q−P) blocks other than the P blocks, updating a parameter of a corresponding block in the (Q−P) blocks by using inverse matrices of additional matrices used by the (Q−P) blocks in an $(N-1)^{th}$ iteration and a first-order gradient of the (Q−P) blocks in the Nth iteration.

12. The method according to claim 11, wherein the method further comprises:
obtaining the P blocks from M blocks in the neural network model based on information about additional matrices of the M blocks, wherein the information about the additional matrix comprises a trace of the additional matrix or a 2-norm of the additional matrix, the M blocks are blocks that are in the Q blocks in the $N^{th}$ iteration and whose additional matrices need to be updated, M is an integer, and Q≥M≥P.

13. The method according to claim 12, wherein the obtaining the P blocks from M blocks in the neural network model based on information about additional matrices of the M blocks comprises:
obtaining the P blocks from the M blocks based on a trace of additional matrices of the M blocks in the $N^{th}$ iteration and a trace of additional matrices of the M blocks in the $(N-1)^{th}$ iteration.

14. The method according to claim 13, wherein the obtaining the P blocks from the M blocks based on a trace of additional matrices of the M blocks in the $N^{th}$ iteration and a trace of additional matrices of the M blocks in the $(N-1)^{th}$ iteration comprises:
obtaining the P blocks whose first ratio is greater than a first threshold from the M blocks, wherein the first ratio is a ratio of a first difference to the trace of the additional matrices in the $(N-1)^{th}$ iteration, and the first difference is a difference between the trace of the additional matrices in the $N^{th}$ iteration and the trace of the additional matrices in the $(N-1)^{th}$ iteration.

15. A non-transitory computer-readable storage medium storing computer instructions which, when executed by at least one processor, cause the at least one processor to perform operations comprising:
updating, in a first iteration period, an inverse matrix of an additional matrix of a neural network model once based on a quantity of iterations indicated by a first update stride, wherein the first iteration period comprises at least two iterations; and
updating, in a second iteration period, the inverse matrix of the additional matrix of the neural network model once based on a quantity of iterations indicated by a second update stride, wherein the second iteration period comprises at least two iterations, a first iteration of the second iteration period is after a last iteration of the first iteration period in an iteration sequence, and the second update stride is greater than the first update stride.

16. The non-transitory computer-readable storage medium according to claim 15, wherein the operations further comprise:
when an $N^{th}$ iteration in a plurality of iterations is in a third iteration period, and is an iteration in which an inverse matrix needs to be updated and that is indicated by a third update stride, updating the inverse matrix of the additional matrix of the neural network model, and updating a parameter in the neural network model by using an updated inverse matrix of the additional matrix and a first-order gradient of the $N^{th}$ iteration, wherein the third update stride is an update stride of the third iteration period, N is an integer, and N>1.

17. The non-transitory computer-readable storage medium according to claim 16, wherein the operations further comprise:
updating inverse matrices of additional matrices of P blocks, wherein the P blocks are some or all of Q blocks of the neural network model, P and Q are integers, Q≥P, Q≥2, and P≥1;
updating a parameter of a corresponding block in the P blocks by using updated inverse matrices of the additional matrices of the P blocks and a first-order gradient of the P blocks in the $N^{th}$ iteration; and
when Q>P, for (Q−P) blocks other than the P blocks, updating a parameter of a corresponding block in the (Q−P) blocks by using inverse matrices of additional matrices used by the (Q−P) blocks in an (N−1) th iteration and a first-order gradient of the (Q−P) blocks in the $N^{th}$ iteration, comprising:
obtaining the P blocks from M blocks in the neural network model based on information about additional matrices of the M blocks, wherein the information about the additional matrix comprises a trace of the additional matrix or a 2-norm of the additional matrix, the M blocks are blocks that are in the Q blocks in the $N^{th}$ iteration and whose additional matrices need to be updated, M is an integer, and Q≥M≥P.

18. The non-transitory computer-readable storage medium according to claim 17, wherein the operations further comprise:
obtaining the P blocks from a plurality of blocks in the neural network model based on sampling probabilities of the plurality of blocks, wherein a sampling probability of a block indicates a probability that an inverse matrix of an additional matrix of the block is updated in the $N^{th}$ iteration.

19. The non-transitory computer-readable storage medium according to claim 16, wherein the operations further comprise:
- updating the inverse matrix when a second difference in the $N^{th}$ iteration is equal to an update start value, wherein the second difference is a difference between N and a total length of a previous iteration period, the previous iteration period is located before the third iteration period in the iteration sequence, and the update start value indicates an iteration in which the inverse matrix is updated for the first time in the third iteration period.

20. The non-transitory computer-readable storage medium according to claim 16, wherein the operations further comprise:
- updating the inverse matrix when a first remainder in the $N^{th}$ iteration is 0, wherein the first remainder is a remainder between a third difference and the third update stride, the third difference is a difference between an (N−an update start value) and a total length of a previous iteration period, the previous iteration period is located before the third iteration period in the iteration sequence, and the update start value indicates an iteration in which the inverse matrix is updated for the first time in the third iteration period.

* * * * *